(12) United States Patent
Ito et al.

(10) Patent No.: US 10,324,285 B2
(45) Date of Patent: Jun. 18, 2019

(54) ABERRATION-CORRECTION METHOD, LASER PROCESSING METHOD USING SAID ABERRATION-CORRECTING METHOD, LASER IRRADIATION METHOD USING SAID ABERRATION-CORRECTING METHOD, ABERRATION-CORRECTING DEVICE AND ABERRATION-CORRECTING PROGRAM

(71) Applicant: HAMAMATSU PHOTONICS K.K., Hamamatsu-shi, Shizuoka (JP)

(72) Inventors: Haruyasu Ito, Hamamatsu (JP); Naoya Matsumoto, Hamamatsu (JP); Takashi Inoue, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 420 days.

(21) Appl. No.: 15/290,233

(22) Filed: Oct. 11, 2016

(65) Prior Publication Data
US 2017/0031158 A1 Feb. 2, 2017

Related U.S. Application Data

(63) Continuation of application No. 15/073,924, filed on Mar. 18, 2016, now Pat. No. 9,488,831, which is a
(Continued)

(30) Foreign Application Priority Data

Sep. 1, 2008 (JP) .................................. 2008-223582
May 25, 2009 (JP) .................................. 2009-125759

(51) Int. Cl.
*B23K 26/03* (2006.01)
*G02B 21/00* (2006.01)
(Continued)

(52) U.S. Cl.
CPC .......... *G02B 27/0025* (2013.01); *B23K 26/00* (2013.01); *B23K 26/03* (2013.01);
(Continued)

(58) Field of Classification Search
CPC .............. G02B 27/0025; G02B 5/1876; G02B 21/0032; G02B 21/02; G02B 21/361;
(Continued)

(56) References Cited

U.S. PATENT DOCUMENTS 4,546,231 A   10/1985   Gresser et al.
6,992,026 B2   1/2006   Fukuyo et al.
(Continued)

FOREIGN PATENT DOCUMENTS

CN   1160228 A    9/1997
CN   1459100     11/2003
(Continued)

OTHER PUBLICATIONS

Mauclair, C., et al., "Ultrafast Laser Writing of Homogeneous Longitudinal Waveguides in Glasses Using Dynamic Wavefront Correction," Optics Express, Apr. 14, 2008, pp. 5481-5492, XP055195991.
(Continued)

*Primary Examiner* — Samuel M Heinrich
(74) *Attorney, Agent, or Firm* — Drinker Biddle & Reath LLP

(57) ABSTRACT

In an aberration-correcting method according to an embodiment of the present invention, in an aberration-correcting method for a laser irradiation device 1 which focuses a laser beam on the inside of a transparent medium 60, aberration of a laser beam is corrected so that a focal point of the laser beam is positioned within a range of aberration occurring inside the medium. This aberration range is not less than n×d and not more than n×d+Δs from an incidence plane of the
(Continued)

medium 60, provided that the refractive index of the medium 60 is defined as n, a depth from an incidence plane of the medium 60 to the focus of the lens 50 is defined as d, and aberration caused by the medium 60 is defined as Δs.

20 Claims, 26 Drawing Sheets

Related U.S. Application Data continuation of application No. 13/963,299, filed on Aug. 9, 2013, now Pat. No. 9,415,461, which is a continuation of application No. 13/061,438, filed as application No. PCT/JP2009/064939 on Aug. 27, 2009, now Pat. No. 8,526,091.

(51) Int. Cl.

| | | |
|---|---|---|
| G02B 5/18 | (2006.01) | |
| B23K 26/00 | (2014.01) | |
| B23K 26/06 | (2014.01) | |
| B23K 26/36 | (2014.01) | |
| B23K 26/38 | (2014.01) | |
| B23K 26/40 | (2014.01) | |
| B23K 26/53 | (2014.01) | |
| B23K 26/57 | (2014.01) | |
| G02B 21/02 | (2006.01) | |
| G02B 21/06 | (2006.01) | |
| G02B 21/36 | (2006.01) | |
| G02B 27/00 | (2006.01) | |
| B23K 26/064 | (2014.01) | |
| B23K 26/364 | (2014.01) | |
| G02B 5/32 | (2006.01) | |
| G02F 1/01 | (2006.01) | |
| B23K 101/40 | (2006.01) | |
| B23K 103/00 | (2006.01) | |

(52) U.S. Cl.
CPC ............ *B23K 26/032* (2013.01); *B23K 26/06* (2013.01); *B23K 26/064* (2015.10); *B23K 26/36* (2013.01); *B23K 26/364* (2015.10); *B23K 26/38* (2013.01); *B23K 26/40* (2013.01); *B23K 26/53* (2015.10); *B23K 26/57* (2015.10); *G02B 5/1876* (2013.01); *G02B 21/0032* (2013.01); *G02B 21/02* (2013.01); *G02B 21/06* (2013.01); *G02B 21/361* (2013.01); *G02B 27/0068* (2013.01); *B23K 2101/40* (2018.08); *B23K 2103/50* (2018.08); *G02B 5/32* (2013.01); *G02F 1/01* (2013.01); *G02F 2203/18* (2013.01)

(58) Field of Classification Search
CPC .......................... G02B 21/06; G02B 27/0068; B23K 26/0057; B23K 26/032; B23K 26/06; B23K 26/064; B23K 26/40
USPC ........................ 219/121.6, 121.85; 700/166
See application file for complete search history.

(56) References Cited

U.S. PATENT DOCUMENTS

| | | | |
|---|---|---|---|
| 7,130,551 B2 | 10/2006 | Kobayashi | |
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,626,138 B2 | 12/2009 | Bovatsek et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,897,487 B2 | 3/2011 | Sugiura et al. | |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 8,022,332 B2 | 9/2011 | Eda et al. | |
| 8,198,564 B2 | 6/2012 | Unrath et al. | |
| 8,227,724 B2 | 7/2012 | Fukuyo et al. | |
| 8,526,091 B2 | 9/2013 | Ito et al. | |
| 8,792,162 B2 | 7/2014 | Lippert et al. | |
| 9,138,913 B2 | 9/2015 | Arai et al. | |
| 2005/0063032 A1 | 3/2005 | Igasaki et al. | |
| 2005/0202596 A1 | 9/2005 | Fukuyo et al. | |
| 2005/0272223 A1 | 12/2005 | Fujii et al. | |
| 2006/0144828 A1 | 7/2006 | Fukumitsu et al. | |
| 2006/0148212 A1 | 7/2006 | Fukuyo et al. | |
| 2006/0255024 A1 | 11/2006 | Fukuyo et al. | |
| 2007/0085099 A1 | 4/2007 | Fukumitsu et al. | |
| 2007/0125757 A1 | 6/2007 | Fukuyo et al. | |
| 2007/0158314 A1 | 7/2007 | Fukumitsu et al. | |
| 2007/0252154 A1 | 11/2007 | Uchiyama et al. | |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0149546 A1* | 6/2010 | Kobayashi | G01B 11/2441 356/511 |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0258539 A1 | 10/2010 | Sakamoto | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

(56) References Cited

U.S. PATENT DOCUMENTS

FOREIGN PATENT DOCUMENTS

| CN | 1575432 | 2/2005 |
|---|---|---|
| CN | 101034568 | 9/2007 |
| CN | 101034569 | 9/2007 |
| EP | 1 288 927 | 3/2003 |
| JP | H9-019784 | 1/1997 |
| JP | H10-269611 | 10/1998 |
| JP | H11-326860 | 11/1999 |
| JP | 2001-228449 | 8/2001 |
| JP | 2002-207202 | 7/2002 |
| JP | 2004-341394 | 12/2004 |
| JP | 2004-348053 | 12/2004 |
| JP | 2005-224841 | 8/2005 |
| JP | 2006-9427 | 1/2006 |
| JP | 2006-68762 | 3/2006 |
| JP | 2006-113185 | 4/2006 |
| JP | 2009-34723 | 2/2009 |
| KR | 10-2005-0085480 | 8/2005 |
| TW | 320585 | 11/1997 |
| TW | 1265063 | 11/2006 |
| WO | WO 01/048745 | 7/2001 |
| WO | WO 2003/036368 A1 | 5/2003 |

OTHER PUBLICATIONS

Booth, M.J., et al., "Aberration Correction for Confocal Imagining in Refractive-Index Mismatched Media," Journal of Microscopy, vol. 192, No. 2, Nov. 1, 1998, pp. 90-98, XP055196103.

Ohtaki, S., et al., "The Applications of a Liquid Crystal Panel for the 15 Gbyte Optical Disk Systems," Japanese Journal of Applied Physics, vol. 38, No. 3B, Mar. 1, 1999, pp. 1744-1749, XP000905987.

Kubota, Hiroshi, "Advanced Study of Aberration," pp. 128-130, 1964, with its attached English-language translation.

U.S. Appl. No. 13/206,181 filed Aug. 9, 2011.
U.S. Appl. No. 13/269,274 filed Oct. 7, 2011.
U.S. Appl. No. 13/235,936 filed Sep. 19, 2011.
U.S. Appl. No. 13/213,175 filed Aug. 19, 2011.
U.S. Appl. No. 13/233,662 filed Sep. 15, 2011.
U.S. Appl. No. 13/107,056 filed May 13, 2011.
U.S. Appl. No. 13/151,877 filed Jun. 2, 2011.
U.S. Appl. No. 13/131,429 filed Jun. 28, 2011.
U.S. Appl. No. 13/143,636 filed Sep. 21, 2011.
U.S. Appl. No. 13/148,097 filed Aug. 26, 2011.
U.S. Appl. No. 13/262,995 filed Oct. 5, 2011.
U.S. Appl. No. 13/265,027 filed Oct. 18, 2011.

Taku Inoue et al., "Liquid-crystal spatial light modulator as a wavefront control element and adaptive optics", Optical and Electro-optical Engineering Contact, May 20, 2007, vol. 45, No. 5, pp. 251-257, (with English translation).

Hiroshi Kubota, et al., "Advanced Study of Aberration", Jun. 30, 1971, pp. 128-130 and 300-301, (with English translation).

Haruyasu Ito et al., "High-intensity femtosecond laser optical wavefront control using a spatial light modulator", Optronics, Apr. 10, 2009, No. 328, pp. 218-223, (with English translation).

Haruyasu Itoh et al., "Spherical aberration correction suitable for a wavefront controller", Optics Express, Aug. 3, 2009, vol. 17, No. 16, pp. 14367-14373.

X. Liu et al., "Laser Ablation and Micromachining with Ultrashort Laser Pulses," IEEE Journal of Quantum Electronics, vol. 33, No. 10, Oct. 1997, pp. 1706-1716.

* cited by examiner

*Fig.11*

$$\Phi'_{1x} = a_{11}*x + a_{21}*x^2 \cdots + a_{q1}*x^q \cdots + a_{Q1}*x^Q$$

$$\Phi'_{2x} = a_{12}*x + a_{22}*x^2 \cdots + a_{q2}*x^q \cdots + a_{Q2}*x^Q$$

$$\vdots$$

$$\Phi'_{px} = a_{1p}*x + a_{2p}*x^2 \cdots + a_{qp}*x^q \cdots + a_{Qp}*x^Q$$

$$\vdots$$

$$\Phi'_{Px} = a_{1P}*x + a_{2P}*x^2 \cdots + a_{qP}*x^q \cdots + a_{QP}*x^Q$$

*Fig.13*

$$A_1 = b_{11}*d + b_{21}*d^2 \cdots + b_{k1}*d^k \cdots + b_{K1}*d^K$$
$$A_2 = b_{12}*d + b_{22}*d^2 \cdots + b_{k2}*d^k \cdots + b_{K2}*d^K$$
$$\vdots$$
$$A_q = b_{1q}*d + b_{2q}*d^2 \cdots + b_{kq}*d^k \cdots + b_{Kq}*d^K$$
$$\vdots$$
$$A_Q = b_{1Q}*d + b_{2Q}*d^2 \cdots + b_{kQ}*d^k \cdots + b_{KQ}*d^K$$

*Fig.14*

$b_{11}, b_{21}, \cdots, b_{k1}, \cdots, b_{K1}$
$b_{12}, b_{22}, \cdots, b_{k2}, \cdots, b_{K2}$
$\vdots$
$b_{1q}, b_{2q}, \cdots, b_{kq}, \cdots, b_{Kq}$
$\vdots$
$b_{1Q}, b_{2Q}, \cdots, b_{kQ}, \cdots, b_{KQ}$
$c_1, c_2, \cdots, c_m, \cdots, c_M$ (b)

(a)

ABERRATION-CORRECTION METHOD, LASER PROCESSING METHOD USING SAID ABERRATION-CORRECTING METHOD, LASER IRRADIATION METHOD USING SAID ABERRATION-CORRECTING METHOD, ABERRATION-CORRECTING DEVICE AND ABERRATION-CORRECTING PROGRAM

This is a continuation application of application Ser. No. 15/073,924, having a filing date of Mar. 18, 2016, which is a continuation application of prior application Ser. No. 13/963,299, having a filing date of Aug. 9, 2013, which issued as U.S. Pat. No. 9,415,461 on Aug. 16, 2016, which is a continuation application of prior application Ser. No. 13/061,438, having a § 371 date of Apr. 26, 2011, which issued as U.S. Pat. No. 8,526,091 on Sep. 3, 2013, which is a national stage filing based on PCT International Application No. PCT/JP2009/064939, filed on Aug. 27, 2009. The copending application Ser. Nos. 15/073,924, 13/963,299 and 13/061,438 are incorporated by reference herein in their entireties.

TECHNICAL FIELD

The present invention relates to an aberration-correcting method for correcting an aberration of a laser irradiation device, a laser processing method using said aberration-correcting method, a laser irradiation method using said aberration-correcting method, an aberration-correcting device, and an aberration-correcting program.

BACKGROUND ART

A laser irradiation device is used in various optical devices such as laser processing devices and microscopes. Some laser processing devices using said laser irradiation device includes a special light modulator (hereinafter, referred to as an SLM). Patent Literatures 1 to 5 listed below disclose laser processing devices including an SLM.

The laser processing devices described in Patent Literatures 1 and 2 control a laser beam irradiation position in a processing target, and the laser processing device described in Patent Literature 3 controls a laser beam by using an SLM. The laser processing device described in Patent Literature 4 includes a means for measuring wavefront distortion of a laser beam, and corrects measured wavefront distortion by using an SLM. However, this method needs a means for measuring wavefront distortion, and the optical system thereby becomes complicated, and this method is not applicable to the case where measurement of wavefront distortion is impossible such as laser processing.

Patent Literature 5 describes a problem in that aberration occurs when a laser beam is focused on a transparent medium, and a processing point becomes longer in a depth direction, and the laser processing device described in Patent Literature 5 positively utilizes chromatic aberration caused by medium dispersion, etc., and optical path change according to a wavelength on a diffraction element, and controls a processing position by adjusting an intensity of each of light source wavelengths.

Patent Literature 6 describes a method for correcting aberration by applying a phase distribution opposite to known aberration to incident light by a wavefront control element such as an SLM. Here, in Non-Patent Literature 1, spherical aberration caused by inserting a plane parallel plate into an optical system is analytically obtained according to paraxial approximation. Focusing of a laser beam on a transparent medium is equivalent to insertion of a plane parallel plate into an optical system, so that by handling the results described in Non-Patent Literature 1 as known aberration in the method of Patent Literature 6, spherical aberration caused by focusing of a laser beam on a transparent medium can be corrected. However, in this method, the phase range of the phase distribution opposite to the aberration becomes larger over the performance of the wavefront control element, so that the method is not applicable when the laser is irradiated deep inside the medium. Further, an accurate laser irradiation position cannot be obtained.

CITATION LIST

Patent Literature

[Patent Literature 1] Japanese Patent Application Laid-Open Publication No. 2006-68762
[Patent Literature 2] Japanese Patent Application Laid-Open Publication No. 2006-119427
[Patent Literature 3] Japanese Patent Application Laid-Open Publication No. 2002-207202
[Patent Literature 4] Japanese Patent Application Laid-Open Publication No. 2006-113185
[Patent Literature 5] Japanese Patent Application Laid-Open Publication No. 2005-224841
[Patent Literature 6] WO 2003/036368

Non Patent Literature

[Non-Patent Literature 1] Hiroshi Kubota, "Optics", Iwanami Shoten, Publishers, 1967, pp. 127-128 and 300-301

SUMMARY OF INVENTION

Technical Problem

It has been demanded that laser processing devices perform finer processing. For example, in a case where a modified layer such as an optical waveguide is formed, a focal point as small as possible has been demanded. However, if the processing position is deep, the focal region is expanded by aberration, so that it becomes difficult to maintain an excellent processing state.

Therefore, an object of the present invention is to provide an aberration-correcting method capable of improving the concentration of a focused laser beam even if a laser is irradiated deep inside a medium, a laser processing method using said aberration-correcting method, a laser irradiation method using said aberration-correcting method, an aberration-correcting device, and an aberration-correcting program.

Solution to Problem

The inventors of the present invention repeatedly and earnestly conducted studies, and as a result, found that as a laser irradiation position in a medium becomes deep, a PV (peak to valley) value (a PV value is a difference between a maximum value and a minimum value of wavefront aberration, and is equivalent to a phase modulation amount) of a wavefront for correcting a laser beam increases and exceeds performance of an element that controls a wavefront such as a spatial light modulator or the like, so that it becomes impossible to sufficiently correct aberration. A spatial light modulator capable of controlling wavefront is a phase modulation-type spatial light modulator which applies a voltage to an independent pixel, a deformable mirror which deforms a membrane mirror by an actuator, or the like. Generally, a phase modulation range physically applicable by a phase modulation-type spatial light modulator which applies a voltage to an independent pixel is approximately $2\pi$ to $6\pi$. This range is referred to as a physical phase modulation range. However, by using the phase wrapping technique, the effective phase modulation range can be widened to several tens of wavelength. The phase modulation range that is effective and widened by the phase wrapping technique is referred to as an effective phase modulation range. The phase wrapping technique is a technique for wrapping a phase distribution having a value exceeding the physical phase modulation range into the physical phase modulation range by using the fact that the phase 0 is equal to $2n\pi$ (n is an integer). However, on a wavefront for correcting a laser beam, if a difference in phase modulation amount between adjacent pixels in the spatial light modulator exceeds the physical phase modulation range, the phase wrapping technique cannot be applied. Therefore, if the difference in phase modulation amount between adjacent pixels in the spatial light modulator exceeds the physical phase modulation range, the wavefront for correcting aberration cannot be sufficiently reproduced, and the concentration of the focused laser beam decreases, and excellent processing becomes difficult. In other spatial light modulators such as deformable mirrors, the physical phase modulation range is larger than in the phase modulation-type spatial light modulator that applies a voltage to an independent pixel, however, the phase range capable of being modulated is limited, so that when the laser irradiation position becomes deep, aberration cannot be sufficiently corrected. In the case of a deformable mirror, only a spatially continuous phase distribution can be modulated, and the phase wrapping technique cannot be applied, so that the physical phase modulation range is equal to the effective phase modulation range.

Then, the inventors of the present invention found that when aberration of a laser beam is corrected so that the position in the optical axis direction of the focal point of the laser beam after being corrected is within a range between the position in the optical axis direction of the focal point of a paraxial ray before being corrected and a focal point of an outermost ray before being corrected, that is, a range in which longitudinal aberration is present inside a medium, the PV value of wavefront modulation supplied for aberration correction is reduced. As a result of reduction in the PV value of wavefront modulation for aberration correction, even when the focal position is deep, the difference in phase modulation amount between adjacent pixels in the spatial light modulator is reduced, and it becomes possible to apply the phase wrapping technique. Hereinafter, the wavefront modulation pattern for aberration correction before phase wrapping is applied will be referred to as a correction wavefront, and a pattern obtained by applying phase wrapping to the correction wavefront will be referred to as an aberration correction phase pattern.

The aberration-correcting method of the present invention is characterized in that, in an aberration-correcting method for a laser irradiation device which focuses a laser beam on the inside of a transparent medium, aberration of a laser beam is corrected so that a focal point of the laser beam is positioned in an aberration range generated inside the medium. Here, "a focal point of the laser beam is positioned in an aberration range generated inside the medium" means that a focal point is positioned within a range in which longitudinal aberration is present inside the medium when the aberration is not corrected.

According to this aberration-correcting method, aberration of a laser beam is corrected so that the focal point of the laser beam is positioned in an aberration range generated inside the medium, that is, positioned within a range in which longitudinal aberration is present inside the medium when aberration is not corrected, so that the PV value of the wavefront can be reduced. As a result, even when a spatial light modulator the phase modulation amount of which is limited is used, by reducing the phase modulation amount for aberration correction, the task on the spatial light modulator is reduced, and precise wavefront control is possible. As a result, even if the laser is irradiated deep inside the medium, the concentration of the focused laser beam can be increased, and an excellent processing state can be maintained.

The above-described laser irradiation device includes a focusing means for focusing a laser beam on the inside of a medium, and when the refractive index of the medium is defined as n, a depth from an incidence plane of the medium to the focus of the focusing means on the assumption that the refractive index n of the medium is equal to that of a focusing means atmospheric medium (hereinafter, referred to as a medium movement distance) is defined as d, and a maximum value of longitudinal aberration caused by the medium is defined as $\Delta s$, the above-described longitudinal aberration range is approximately not less than $n \times d$ and not more than $n \times d + \Delta s$ from the incidence plane of the medium, and in the above-described aberration-correcting method, aberration of the laser beam is corrected so that the focal point of the laser beam is positioned within a range more than $n \times d$ and less than $n \times d + \Delta s$ from the incidence plane of the medium.

The above-described laser irradiation device includes a condenser lens for focusing a laser beam on the inside of the medium, and a spatial light modulator for correcting aberration of a laser beam, and in the above-described aberration-correcting method, a phase difference between a phase modulation amount at an arbitrary pixel on the spatial light modulator corresponding to an incidence portion of the condenser lens and a phase modulation amount at a pixel adjacent to said pixel is not more than a phase range to which the phase wrapping technique is applicable.

With this configuration, the phase difference between adjacent pixels becomes smaller, so that phase wrapping in the spatial light modulator the physical phase modulation range of which is limited can be realized, and precise wavefront control is possible.

In the above-described aberration-correcting method, the focal point of the laser beam is set so that the phase value of the correction wavefront has a local maximum point and a local minimum point.

By thus setting the focal point so that the phase value of the correction wavefront has a local maximum point and a local minimum point, the PV value of the correction wavefront can be reduced.

According to the laser processing method of the present invention, in a laser processing method for a laser processing device including a light source for generating a laser beam, a spatial light modulator for modulating the phase of a laser beam from the light source, and a condenser lens for focusing the laser beam from the spatial light modulator on a processing position inside a processing target, a processing position inside the processing target is set, and a relative movement distance of the processing target is set so that the processing position is positioned within a range in which longitudinal aberration is present inside the processing target when the aberration is not corrected, a correction wavefront is calculated so that the laser beam is focused on the processing position, and displayed on the spatial light modulator, a focal position is relatively moved so that the distance between the processing target and the condenser lens becomes the relative movement distance, and the laser beam from the light source is irradiated onto the processing position in the processing target.

According to this laser processing method, the processing position is set in a range in which longitudinal aberration is present inside the processing target when the aberration is not corrected, and aberration of a laser beam is corrected by the spatial light modulator so that the focal point of the laser beam is positioned at this processing position, so that the PV value of the wavefront can be reduced. As a result, even when a spatial light modulator the phase modulation amount of which is limited is used, by reducing the phase modulation amount for aberration correction, the task on the spatial light modulator is reduced, and precise wavefront control is realized. As a result, even if the laser is irradiated deep inside the processing target, the concentration of the focused laser beam can be increased, and an excellent processing state can be maintained.

Further, according to the laser processing method of the present invention, in a laser processing method for an inner-medium laser focusing device including a light source for generating a laser beam, a spatial light modulator for modulating the phase of a laser beam from the light source, and a condenser lens for focusing the laser beam from the spatial light modulator on a predetermined focal position inside a medium, the focal position inside the medium is set, and a relative movement distance of the medium is set so that the focal position is positioned within a range in which longitudinal aberration is present inside the medium when the aberration is not corrected, a correction wavefront is calculated so that the laser beam is focused on the focal position, and displayed on the spatial light modulator, the focal position is relatively moved so that the distance between the medium and the condenser lens becomes the relative movement distance, and the laser beam from the light source is irradiated onto the focal position in the medium.

According to this laser irradiation method, the focal position is set in a range in which longitudinal aberration is present inside the medium when the aberration is not corrected, and aberration of the laser beam is corrected by the spatial light modulator so that the focal point of the laser beam is positioned at this focal position, so that the PV value of the wavefront can be reduced. As a result, even when a spatial light modulator the phase modulation amount of which is limited is used, by reducing the phase modulation amount for aberration correction, the task on the spatial light modulator is reduced, and precise wavefront control is realized. As a result, even if the laser is irradiated deep inside the medium, the concentration of the focused laser beam can be increased, and an excellent focused state can be maintained.

Another aberration-correcting method of the present invention includes, in an aberration-correcting method for a laser irradiation device which focuses a laser beam on the inside of a transparent medium, (a) a first correction wavefront generation step for obtaining a plurality of correction wavefronts which are for correcting aberration of a laser beam so that a focal point of the laser beam is positioned within a range in which longitudinal aberration is present inside a medium when the aberration is not corrected, and correspond to a plurality of processing positions inside the medium, and a plurality of distances (medium movement distances), which are correspond to the plurality of processing positions inside the medium, from a medium surface to the positions of the focal points when the medium is absent; (b) a first polynomial approximation step for obtaining a first high-order polynomial by performing high-order polynomial approximation of the plurality of distances from the medium surface to the positions of the focal points when the medium is absent; (c) a second polynomial approximation step for obtaining a plurality of second high-order polynomials by performing high-order polynomial approximation of the plurality of correction wavefronts; (d) a third polynomial approximation step for obtaining a plurality of third high-order polynomials including the processing positions as parameters by performing high-order polynomial approximation of a plurality of coefficient sequences consisting of coefficients of the same order terms in the plurality of second high-order polynomials; (e) a storing step for storing coefficients of a plurality of order terms in the first high-order polynomials and coefficients of a plurality of order terms in the plurality of third high-order polynomials; and (f) a second correction wavefront generation step for obtaining a correction wavefront of an arbitrary processing position by using a second high-order polynomial by obtaining the second high-order polynomial of the arbitrary processing position equivalent to the plurality of the second high-order polynomials by using coefficients of a plurality of order terms in the first high-order polynomial, the first high-order polynomial, coefficients of a plurality of order terms in the plurality of third high-order polynomials, and the plurality of third high-order polynomials.

An aberration-correcting device of the present invention includes, in an aberration-correcting device for a laser irradiation device which focuses a laser beam on the inside of a transparent medium, (a) a first correction wavefront generation means for obtaining a plurality of correction wavefronts which are for correcting aberration of the laser beam so that a focal point of the laser beam is positioned within a range in which longitudinal aberration is present inside the medium when the aberration is not corrected, and correspond to a plurality of processing positions inside the medium, and a plurality of distances (medium movement distances), which are correspond to the plurality of processing positions inside the medium, from a medium surface to positions of the focal points when the medium is absent; (b) a first polynomial approximation means for obtaining a first high-order polynomial by performing high-order polynomial approximation of the plurality of distances from the medium surface to the positions of the focal points when the medium is absent; (c) a second polynomial approximation means for obtaining a plurality of second high-order polynomials by performing high-order polynomial approximation of the plurality of correction wavefronts; (d) a third polynomial approximation means for obtaining a plurality of third high-order polynomials including the processing positions as parameters by performing high-order polynomial approximation of a plurality of coefficient sequences consisting of coefficients of the same order terms in the plurality of second high-order polynomials; (e) a storing means for storing coefficients of a plurality of order terms in the first high-order polynomials and coefficients of a plurality of order terms in the plurality of third high-order polynomials; and (f) a second correction wavefront generation means for obtaining a correction wavefront of an arbitrary processing position by using a second high-order polynomial by obtaining the second high-order polynomial of the arbitrary processing position equivalent to the plurality of high-order polynomials by using coefficients of a plurality of order terms in the first high-order polynomial, the first high-order polynomial, coefficients of a plurality of order terms in the plurality of third high-order polynomials, and the plurality of third high-order polynomials.

An aberration-correcting program of the present invention makes a computer function as, in an aberration-correcting program for a laser irradiation device which focuses a laser beam on the inside of a transparent medium, (a) a first correction wavefront generation means for obtaining a plurality of correction wavefronts which are for correcting aberration of the laser beam so that a focal point of the laser beam is positioned within a range in which longitudinal aberration is present inside the medium when the aberration is not corrected, and correspond to a plurality of processing positions inside the medium, and a plurality of distances (medium movement distances), which are correspond to the plurality of processing positions inside the medium, from a medium surface to positions of the focal points when the medium is absent; (b) a first polynomial approximation means for obtaining a first high-order polynomial by performing high-order polynomial approximation of the plurality of distances from the medium surface to the positions of the focal points when the medium is absent; (c) a second polynomial approximation means for obtaining a plurality of second high-order polynomials by performing high-order polynomial approximation of the plurality of correction wavefronts; (d) a third polynomial approximation means for obtaining a plurality of third high-order polynomials including the processing positions as parameters by performing high-order polynomial approximation of a plurality of coefficient sequences consisting of coefficients of the same order terms in the plurality of second high-order polynomials; (e) a storing means' for storing coefficients of a plurality of order terms in the first high-order polynomials and coefficients of a plurality of order terms in the plurality of third high-order polynomials; and (f) a second correction wavefront generation means for obtaining a correction wavefront of an arbitrary processing position by using a second high-order polynomial by obtaining the second high-order polynomial of the arbitrary processing position equivalent to the plurality of the second high-order polynomials by using coefficients of a plurality of order terms in the first high-order polynomial, the first high-order polynomial, coefficients of a plurality of order terms in the plurality of third high-order polynomials, and the plurality of third high-order polynomials.

According to these other aberration-correcting method and aberration-correcting device and aberration-correcting program of the present invention, correction wavefronts for correcting aberration of a laser beam so that a focal point of the laser beam is positioned within a range in which longitudinal aberration is present inside a medium when the aberration is not corrected are obtained in advance, and by using an approximate expression using high-order polynomial approximation of the correction wavefronts, a correction wavefront at an arbitrary processing position is obtained, so that the correction wavefront at the arbitrary processing position can correct aberration of the laser beam so that the focal point of the laser beam is positioned within a range in which longitudinal aberration is present inside the medium when the aberration is not corrected, and the PV value of the wavefront can be reduced. As a result, even if a spatial light modulator the phase modulation amount of which is limited is used, by reducing the phase modulation amount for aberration correction, the task on the spatial light modulator is reduced, and precise wavefront control becomes possible. As a result, even if a laser is irradiated deep inside a medium, the concentration of a focused laser beam can be increased, and an excellent processing state can be maintained.

Here, the shape and size of the aberration differ depending on the focal position, so that in processing involving a change in processing depth (processing position), the correction wavefront must be re-calculated for each change, so that it takes a great deal of calculation time. For example, in order to obtain a correction wavefront so that a focal point of a laser beam is positioned within a range in which longitudinal aberration is present inside a medium when the aberration is not corrected, proper values must be derived by performing multiple searching for a plurality of parameters, and this takes a great deal of calculation time. As a result, when performing processing while changing the processing depth, searching during processing causes a lowering in the processing rate.

However, according to these other aberration-correcting method and aberration-correcting device and aberration-correcting program of the present invention, correction wavefronts for a plurality of processing positions are obtained in advance, and high-order polynomial approximation of these correction wavefronts is performed, so that a proper correction wavefront can be obtained by only performing an arithmetic operation using the approximate expression. As a result, the time to be taken for re-calculating a correction wavefront when changing the processing depth can be shortened, and a lowering in the processing rate can be reduced. Even for an arbitrary processing position different from the processing positions obtained in actuality by the above-described searching, a proper correction wavefront can be obtained.

According to still another aberration-correcting method of the present invention, in an aberration-correcting method for a light irradiation device which focuses irradiation light on the inside of a transparent medium, aberration of irradiation light is corrected so that a focal point of the irradiation light is positioned within a range in which longitudinal aberration is present inside the medium when the aberration is not corrected.

According to this aberration-correcting method, aberration of irradiation light is corrected so that a focal point of the irradiation light is positioned within a range in which longitudinal aberration is present inside the medium when the aberration is not corrected, so that the PV value of the wavefront can be reduced. As a result, even if a spatial light modulator the phase modulation amount of which is limited is used, by reducing the phase modulation amount for aberration correction, the task on the spatial light modulator is reduced and precise wavefront control is realized. As a result, even if a light is irradiated deep inside the medium, the concentration of the focused irradiation light can be increased, and an excellent processing state can be maintained.

Advantageous Effects of Invention

According to the present invention, even if a laser is irradiated deep inside a medium, the concentration of the focused laser beam can be increased.

BRIEF DESCRIPTION OF DRAWINGS

FIG. 11 is a diagram showing a plurality of second high-order polynomials obtained by a second polynomial approximation means.

FIG. 13 is a diagram showing a plurality of third high-order polynomials obtained by a third polynomial approximation means.

FIG. 14 is a view showing a coefficient data set to be stored in a storing means, which is coefficients of a plurality of order terms in the plurality of third high-order polynomials shown in FIG. 13, and a coefficient sequence in the first high-order polynomial.

DESCRIPTION OF EMBODIMENTS

Figure 1:
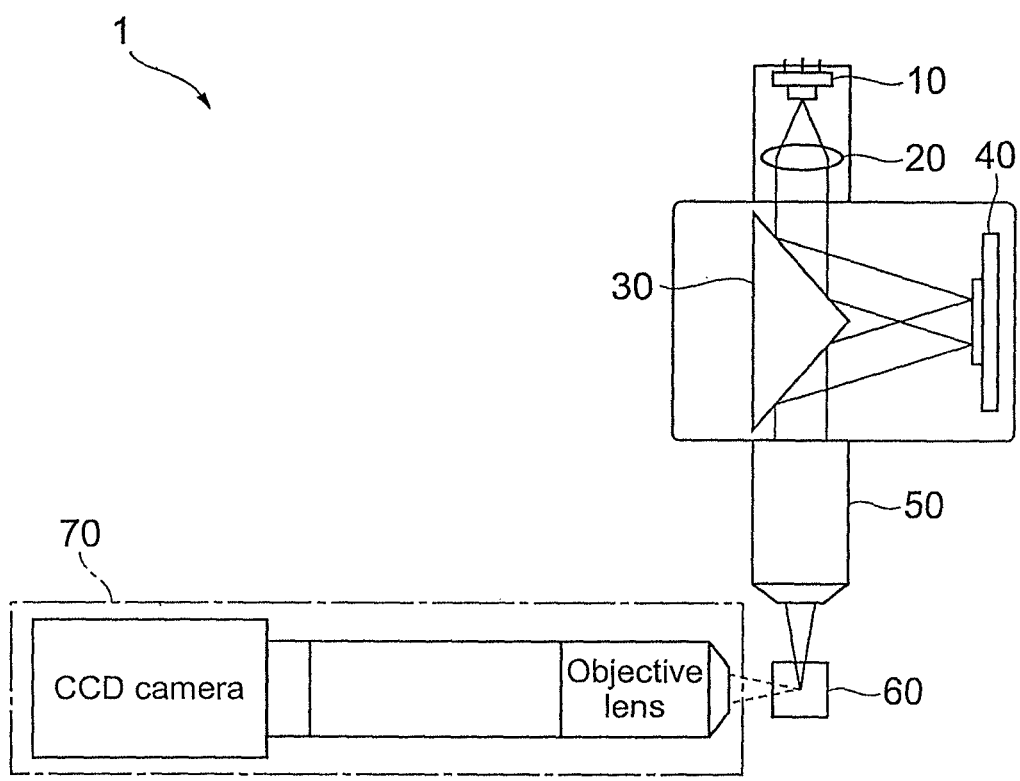
FIG. 1 is a view showing a configuration of a laser processing device (laser irradiation device, laser focusing device) according to a first embodiment.

Hereinafter, preferred embodiments of the present invention will be described in detail with reference to the drawings. Portions identical or equivalent to each other in the drawings will be designated by the same reference numeral.

[First Embodiment]

First, before describing an aberration-correcting method, a laser processing method, and a laser irradiation method according to a first embodiment of the present invention, a laser processing device (laser irradiation device, laser focusing device) using this aberration-correcting method will be shown.

FIG. 1 is a view showing a configuration of a laser processing device (laser irradiation device, laser focusing device) according to a first embodiment. A laser processing device 1 shown in FIG. 1 includes a light source 10, a lens 20, a mirror 30, a spatial light modulator (hereinafter, referred to as an SLM) 40, and an objective lens (focusing means, condenser lens) 50. In FIG. 1, a processing target 60 and a measurement system 70 for measuring a focused state of a laser beam in the processing target 60 are shown.

The light source 10 outputs a laser beam. The lens 20 is, for example, a collimating lens, and collimates the laser beam from the light source 10 into parallel light. The mirror 30 reflects the laser beam from the lens 20 toward the SLM 40, and reflects a laser beam from the SLM 40 toward the objective lens 50. The SLM 40 is, for example, an LCOS-SLM (Liquid Crystal on Silicon—Spatial Light Modulator), and modulates the phase of the laser beam from the mirror 30. The objective lens 50 focuses the laser beam from the mirror 30 and makes it outgo to the processing target 60.

In the present embodiment, a focused state of the laser beam in the processing target 60 can be measured with the measurement system 70. The measurement system 70 includes a CCD camera and an objective lens.

Next, the concept of the conventional spherical aberration-correcting method will be described.

Figure 2:
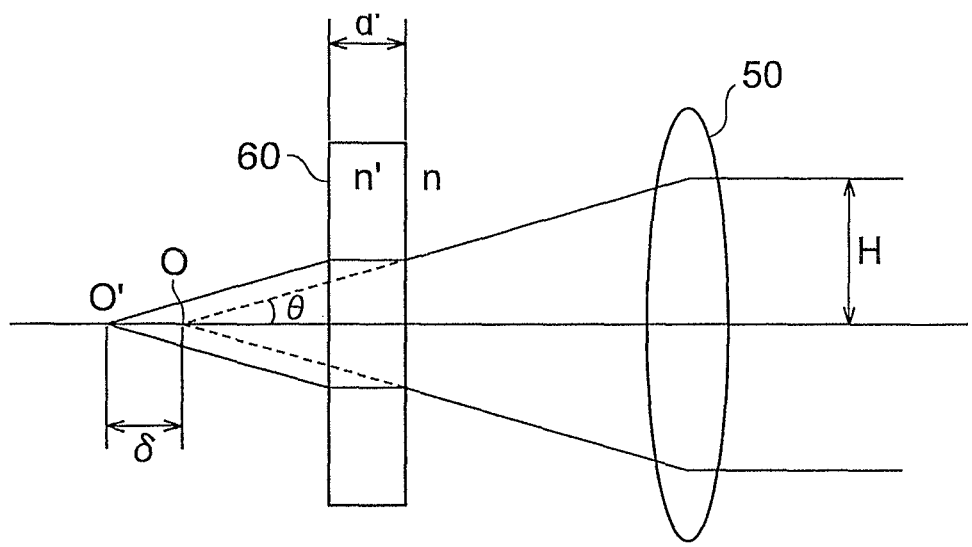
FIG. 2 is a view showing an optical path of a laser beam when a parallel plane is inserted in a focusing optical system.

FIG. 2 is a view showing an optical path of a laser beam when a parallel plane is inserted in a focusing optical system. As shown in FIG. 2, when a transparent medium 60 having a parallel plane shape is inserted in a focusing optical system including the condenser lens 50, the focus deviates by δ from O to O'. This focus deviation value δ changes depending on the incident height H of incident light that is made incident on the condenser lens 50. Due to a change in the focal point position according to incident light, spherical aberration occurs. At this time, the deviation in the optical axis direction from the focal position of the paraxial ray becomes spherical aberration expressed as longitudinal aberration (longitudinal spherical aberration), and the aberration becomes maximum at the outermost ray. In this case, the maximum value Δs of the longitudinal aberration is expressed by the following expression (1) by using the expression (14-4) described in Section 14-2 of Non-Patent Literature 1.

[Mathematical expression 1]

$$\Delta s = \frac{(n'^2 - n^2)nd'}{2n'^3} \theta_{max}^2 \quad (1)$$

n: Refractive index of atmospheric medium in focusing optical system
n': Refractive index of medium 60
d': Thickness of medium 60
$\theta_{max}$: Incidence angle θ of laser beam to the medium 60, and incidence angle (=arctan (NA)) of outermost ray of the laser beam The longitudinal aberration may be expressed as aberration in the longitudinal direction, longitudinal ray aberration, or longitudinal error.

Figure 3:
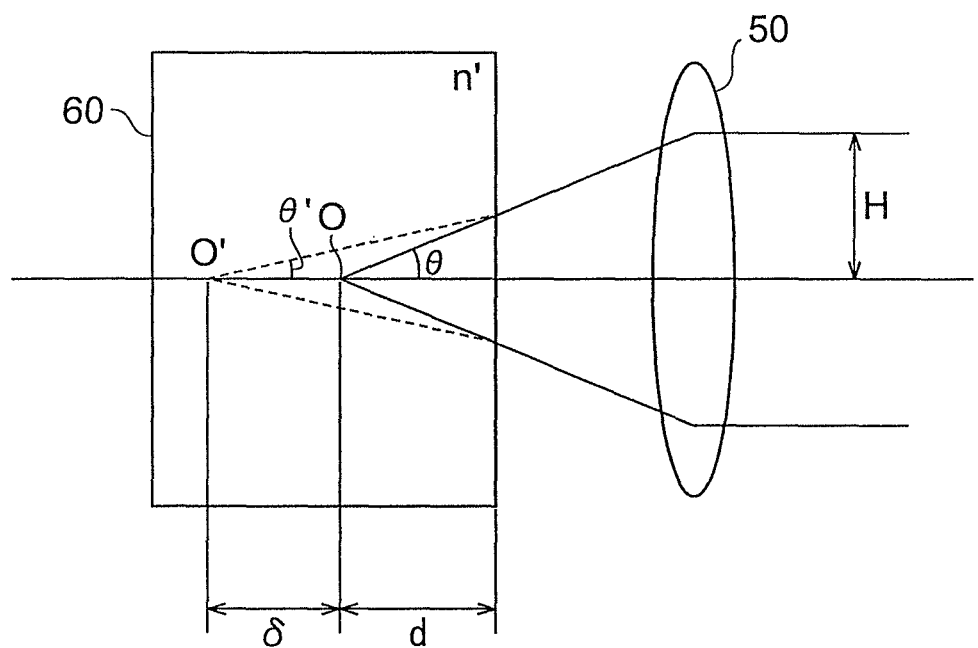
FIG. 3 is a view showing an optical path of a laser beam when a focal point is inside the parallel plane.

FIG. 3 is a view showing an optical path of a laser beam when a focal point is inside the parallel plane. As shown in FIG. 3, when the focus O formed by the condenser lens 50 is inside the transparent medium 60 having a parallel plane shape, the focus deviates by δ from O to O'. This focus deviation δ changes depending on the incident height H of light made incident on the condenser lens 50, so that spherical aberration occurs. In this case, the maximum value Δs of the longitudinal aberration is expressed by the following expression (2) by transforming the expression (14-3) described in Section 14-2 of Non-Patent Literature 1.

[Mathematical expression 2]

$$\Delta s = -\frac{(n'^2 - 1)}{2n'} \tan^2 \theta_{max} d \quad (2)$$

n': Refractive index of medium 60
d: Medium movement distance
$\theta_{max}$: Incidence angle θ of laser beam to the medium 60, and incidence angle of outermost ray of the laser beam Here, when the focal length of the condenser lens 50 is defined as f, according to the spherical aberration Δs of the expression (2) described above, wavefront aberration E(h) is expressed by the following expression (3) by using the expression (28-6) of Section 28-1 of Non-Patent Literature 1.

[Mathematical expression 3]

$$E(h) = \frac{1}{f^2} \int_0^h (\Delta s) h \, dh \quad (3)$$

According to Patent Literature 6, in order to correct the spherical aberration Δs of the expression (2) described above, the wavefront before focusing, that is, the wavefront to be made incident on the condenser lens 50 is made opposite to the wavefront aberration E(h) of the expression (3). In the laser processing device 1 of the first embodiment, a pattern obtained by applying phase wrapping to a wavefront opposite to the wavefront aberration E(h) of the expression (3) is used as an aberration correction phase pattern of the SLM 40. In this case, the maximum value Δs of longitudinal aberration is expressed by the deviation of the focal position from the paraxial ray, so that the focal point after correction almost matches the focal position of the paraxial ray before correction. However, the aberration is calculated by approximation, so that an accurate focal position cannot be obtained.

Figure 4:
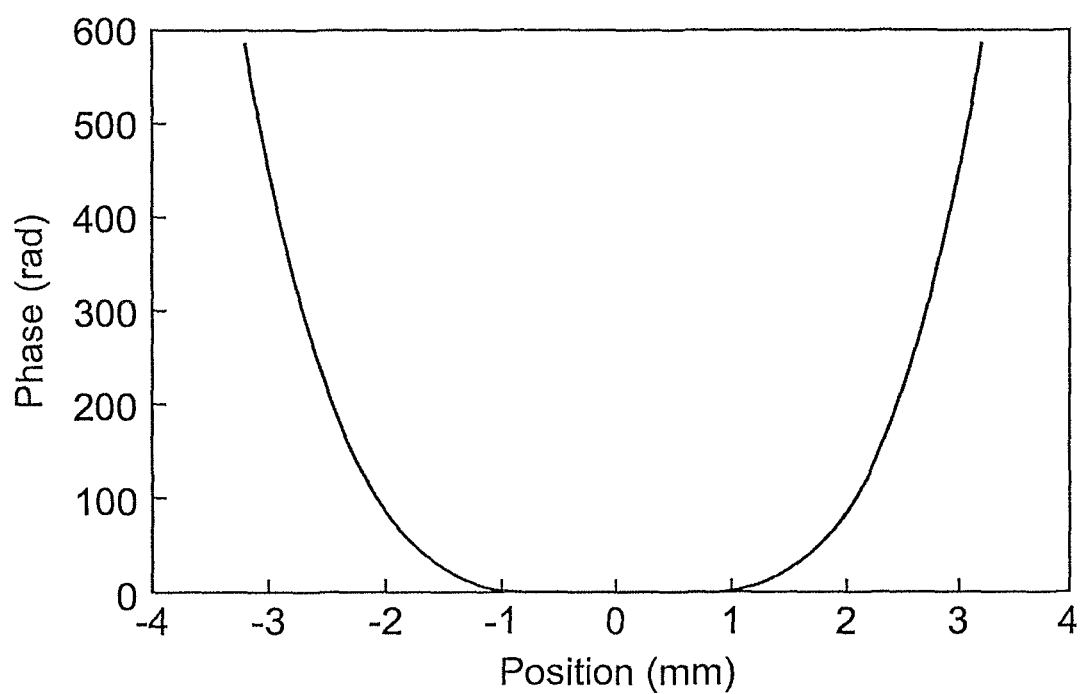
FIG. 4 is a diagram showing a phase modulation amount of a correction wavefront in the focusing optical system of FIG. 3.

For example, when the focal length of the lens 50 is f=4 mm, the refractive index of the processing target 60 is n'=1.49, the numerical aperture is NA=0.8, the laser wavelength is 660 nm, and the medium movement distance is d=0.9 mm, the focal depth after correction approximately becomes medium movement distance d×refractive index n', and is at the position of 1.34 mm from the medium surface. The correction wavefront in this case becomes a correction pattern shown in FIG. 4, and the phase modulation amount of the correction wavefront becomes not less than 600 radians.

As the processing position O' by the laser processing device 1 becomes deeper, the spherical aberration Δs increases, so that the phase modulation amount of the correction wavefront becomes large, and the resolution of the SLM 40 is insufficient, and it becomes difficult to correct the aberration.

Thus, in the correction to return the focal point of a ray with respect to each incident height to the position of the medium movement distance d×refractive index n' by supplying a phase distribution opposite to wavefront aberration to a wavefront control element upon analytically calculating the wavefront aberration, that is, by the correction to adjust the focal point to the side closest to the condenser lens 50 side in a longitudinal aberration range occurring inside the processing target 60, it is difficult to correct the aberration.

Therefore, in the aberration-correcting method, the laser processing method, and the laser irradiation method according to the first embodiment of the present invention, aberration of a laser beam is corrected so that the focal point of the laser beam is positioned within a range of aberration occurring inside the processing target 60, that is, within a range in which longitudinal aberration is present inside the processing target 60 when the aberration is not corrected. In other words, aberration of a laser beam is corrected so that a focal point of the laser beam is positioned within a range between a focal position in the depth direction of a ray on the optical axis when the aberration is not corrected and a focal position in the depth direction of an outermost ray when the aberration is not corrected. Therefore, in the aberration-correcting method, the laser processing method, and the laser irradiation method of the first embodiment, a correction wavefront is calculated from optical path length differences of the rays. Specifically, instead of supplying a phase distribution opposite to aberration upon calculating the aberration as described in Patent Literature 6, on the assumption that all rays to be made incident on the condenser lens 50 are focused on one point, a correction wavefront is calculated by inverse ray tracing. In this case, by setting the medium movement distance d to a proper value, the PV value of the correction wavefront is made smaller, and aberration correction at a deep position by a spatial light modulator the physical or effective phase modulation range of which is limited becomes possible. Further, an accurate focal depth can be determined.

Figure 5:
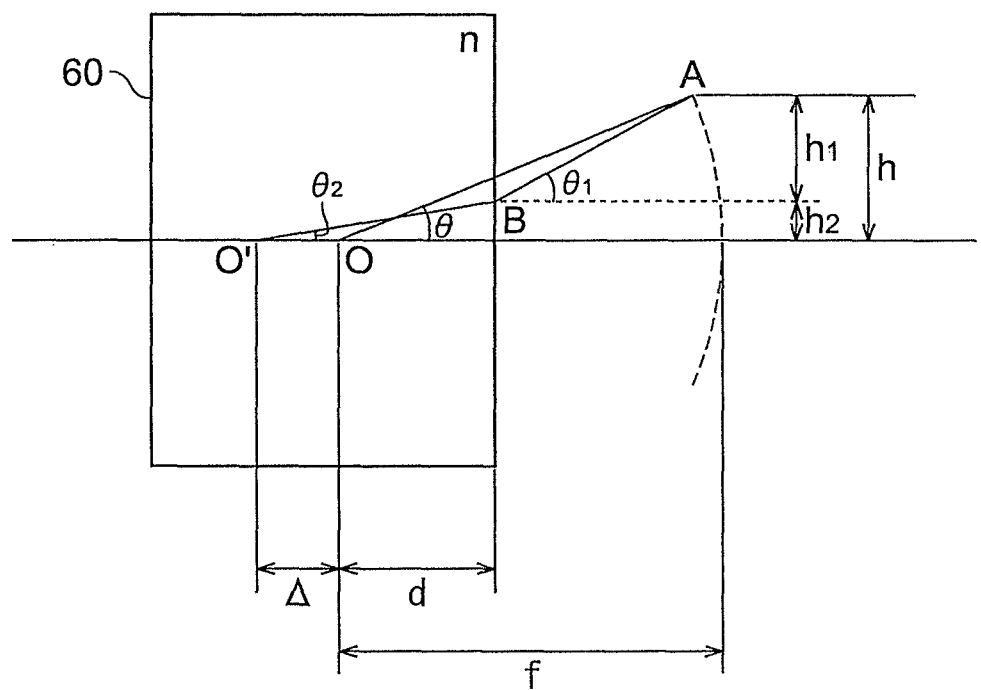
FIG. 5 is a view showing an optical path of a laser beam for describing an aberration-correcting method, a laser processing method, and a laser irradiation method according to the first embodiment of the present invention.

FIG. 5 is a view showing an optical path of a laser beam for describing the aberration-correcting method, the laser processing method, and the laser irradiation method according to the first embodiment of the present invention. As shown in FIG. 5, when an incidence angle of a ray onto the processing target 60 before wavefront correction is defined as θ, an incidence angle of a ray onto the processing target 60 after wavefront correction is defined as $\theta_1$, and the refractive angle is defined as $\theta_2$, the optical axis heights $h_1$, $h_2$, and h are expressed by the following expressions (4), (5), and (6). In FIG. 5, by performing wavefront correction, the optical path of the laser beam to the processing target 60 is different from the optical path before the wavefront correction.

[Mathematical expression 4]

$$h_1 = (f\cos\theta - d)\tan\theta_1 \quad (4)$$

[Mathematical expression 5]

$$h_2 = (d+\Delta)\tan\theta_2 \quad (5)$$

[Mathematical expression 6]

$$h = f\sin\theta \quad (6)$$

Here, $\theta_1$ and $\theta_2$ are uniquely related to each other according to Snell's law, and when $\theta_1$ is given, $\theta_2$ can be obtained, and on the contrary, when $\theta_2$ is given, $\theta_1$ can be obtained. Further, the incidence angles θ, $\theta_1$, and $\theta_2$ are uniquely related to each other by $h=h_1+h_2$ and the expressions (4) to (6). When a specific $\theta_1$ or $\theta_2$ is given, by substituting the expressions (4) and (5) into $h=h_1+h_2$ and solving the expression (6), θ can be easily determined. However, when a specific θ is given, it is difficult to analytically obtain $\theta_1$ and $\theta_2$. In order to obtain $\theta_1$ and $\theta_2$ with respect to a specific θ, searching is performed. For example, searching is performed by gradually changing the value of $\theta_1$ or $\theta_2$, obtaining θ for each change, and changing $\theta_1$ or $\theta_2$ until $\theta_1$ or $\theta_2$ is obtained with which a desired θ is obtained.

On the other hand, the optical path difference OPD (Optical Path Difference) caused by the processing target 60 is expressed by the following expression (7).

[Mathematical expression 7]

$$OPD = \frac{(f \times \cos\theta - d)}{\cos\theta_1} + \frac{n(d+\Delta)}{\cos\theta_2} - f - (n-1)\times d - \Delta \quad (7)$$

"$-f-(n-1)\times d-\Delta$" in the expression (7) is a constant term, and is added for preventing the OPD value from becoming excessive large.

By setting the value Δ of focus deviation after the wavefront correction to a proper value so as to reduce a PV value of a correction wavefront obtained from this expression (7), a phase modulation amount for correcting spherical aberration is reduced. Here, a proper value Δ of focus deviation is obtained by, for example, the above-described searching. That is, the value Δ of focus deviation is set to an initial value of n×d−d, and is gradually changed, and the OPD (θ) is obtained for each change, and Δ is gradually changed until the OPD (θ) in the range of $\theta_{max} \geq \theta \geq -\theta_{max}$ becomes a desired form. d+Δ is a desired focal depth, and is a fixed value, so that Δ and d are changed so that d+Δ is fixed during searching. The focal depth of d+Δ is a fixed value, so that when Δ is determined, the medium movement distance d is also determined by subtracting Δ from the focal depth. Hereinafter, the focal depth (processing position) of d+Δ which is a fixed value is referred to as D.

In detail, the focal point shift amount Δ and the movement distance d are determined so that a phase difference between a phase modulation amount at an arbitrary pixel on the SLM 40 corresponding to the incidence portion of the condenser lens 50 and a phase modulation amount at a pixel adjacent to said pixel becomes not more than the physical phase modulation amount. A laser beam shift amount Δ after the correction satisfies 0<Δ<Δs.

Accordingly, the phase difference between adjacent pixels becomes smaller, so that the task on the SLM 40 the physical phase modulation amount of which is limited can be reduced.

Accordingly, when the refractive index of the processing target 60 is defined as n, the medium movement distance is defined as d, and the maximum value of longitudinal aberration caused by the processing target 60 is defined as Δs, the focal point of the laser beam is at a position not less than n×d and not more than n×d+Δs from the incidence plane of the medium, that is, positioned within a range of longitudinal aberration not less than n×d and not more than n×d+Δs.

In the description above, the focal point shift amount Δ is determined so that the phase difference between a phase modulation amount at an arbitrary pixel on the SLM 40 corresponding to the incidence portion of the condenser lens 50 and a phase modulation amount at a pixel adjacent to said pixel becomes not more than a physical phase modulation amount, however, this searching condition is ambiguous, and a plurality of Δs may become solutions. In order to make easier the determination of the end of searching, the focal point shift amount Δ may be determined based on a greater detailed searching condition. For example, Δ may be determined so that the PV value of the OPD (θ) in the range of $\theta_{max} \geq \theta \geq -\theta_{max}$ becomes minimum. Alternatively, the absolute value of a differential value of the OPD (θ) in the range of $\theta_{max} \geq \theta \geq -\theta_{max}$ becomes minimum. These two conditions as examples are included in or substantially equal to the first condition that the phase difference between a phase modulation amount at an arbitrary pixel on the SLM 40 and a phase modulation amount at a pixel adjacent to said pixel becomes not more than the physical phase modulation amount. As the searching condition, various other conditions are possible such as "RMS (Root Mean Square) of OPD (θ) becomes minimum" and "medium movement distance d is expressed by a specific function using the focal depth D as a variable," etc.

Figure 6:
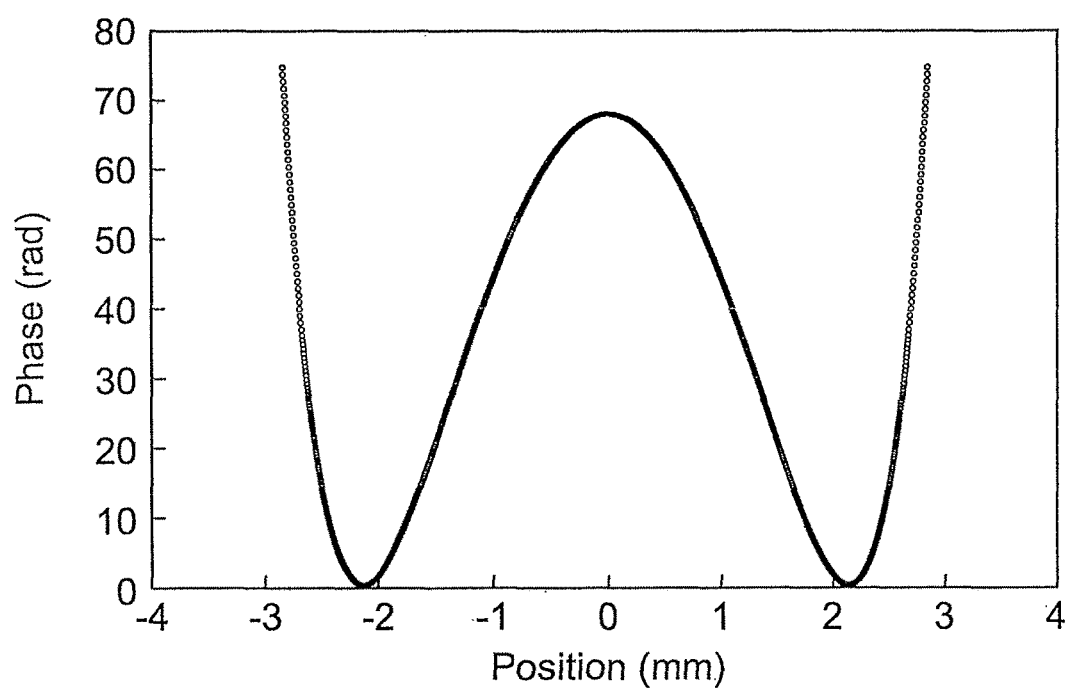
FIG. 6 is a diagram showing a phase modulation amount of a correction wavefront in the focusing optical system of FIG. 5.

For example, when the focal length of the condenser lens 50 is f=4 mm, the refractive index of the processing target 60 is n=1.49, the laser wavelength is 660 nm, the numerical aperture is NA=0.8, and the medium movement distance is d=0.81 mm, Δ as a result of searching by which the PV value of the OPD (θ) becomes minimum is 0.53 mm, a correction wavefront becomes the correction pattern shown in FIG. 6, and the phase modulation amount of the correction wavefront is reduced to approximately 70 radians. The focal depth in this case is D=1.34 mm, and therefore, although the same focal depth as in the case using the conventional method is realized, the phase modulation amount becomes smaller, so that aberration can be sufficiently corrected.

Referring to FIG. 6, the phase value of this correction wavefront has a local maximum point at the position of 0 mm, that is, at the optical axis position. Further, the phase value has local minimum points at the positions of 2 mm and −2 mm. Thus, by setting the focal point so that the phase value of the correction wavefront has a local maximum point and a local minimum point, the PV value of the correction wavefront can be reduced.

Figure 7:
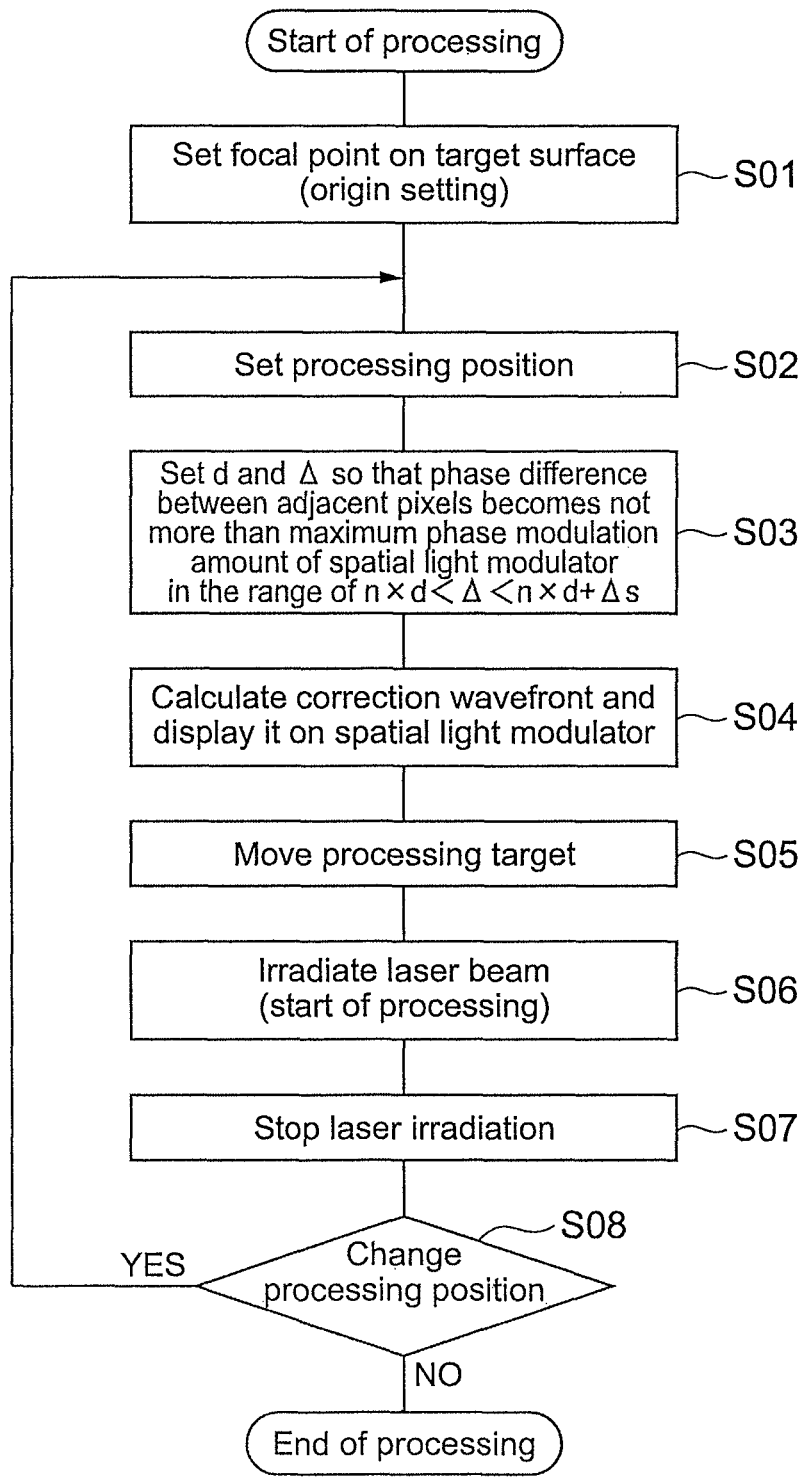
FIG. 7 is a flowchart showing steps of the aberration-correcting method, the laser processing method, and the laser irradiation method of the first embodiment of the present invention.

FIG. 7 is a flowchart showing steps of the aberration-correcting method, the laser processing method, and the laser irradiation method of the first embodiment. First, a focal point is set on the surface of the processing target 60, and this position is defined as a processing origin (Step S01). Next, a processing position (depth) inside the processing target 60 is set (Step S02).

Next, based on the above-described searching condition, the movement distance d of the processing target 60 and the focal point shift amount Δ are set. Accordingly, the movement amount d of the processing target 60 and the focal point shift amount Δ are set so that the processing position is positioned within a range in which longitudinal aberration is present inside the processing target 60 when the aberration is not corrected (a range not less than n×d and not more than n×d+Δs from the incidence plane of the processing target 60) (Step S03). The movement distance d and the shift amount Δ are set so as to become not more than the maximum modulation amount of the spatial light modulator (physical phase modulation range of the spatial light modulator).

Next, a correction wavefront is calculated so that a laser beam is focused on the processing position set at Steps S02 and S03, and displayed on the SLM 40 (Step S04). Next, the processing target 60 is moved by the movement distance d (Step S05). Next, a laser beam is irradiated and processing is started. Then, the laser beam is focused on the set processing position by the correction wavefront of the SLM 40 (Step S06).

Next, at the end of processing, laser beam irradiation is stopped (Step S07). When there is another processing position, the process is returned to Step S02, and when there is no other processing position, processing of this processing target 60 is ended (Step S08).

At Step S05, the relative position of the focusing optical system including the SLM 40 and the condenser lens 50 and the processing target 60 is changed, so that the condenser lens 50 may be moved instead of moving the processing target 60, or both of these may be moved. In the case where the condenser lens 50 is moved, when the entrance pupil of the condenser lens 50 and the SLM 40 are in an image forming relationship, the condenser lens must be moved as a unit of the focusing optical system, that is, the condenser lens must be moved together with the SLM 40.

At Step S01, by focusing the processing laser beam on the surface of the processing target 60, a processing origin is determined, however, the relative position of the condenser lens and the processing target may be determined by using another means, for example, an auto-focusing device or the like.

In the example described above, the wavefront form is controlled by using a phase modulation-type spatial light modulator which applies a voltage to an independent pixel, however, another spatial light modulator such as a deformable mirror may also be used. When a spatial light modulator such as a deformable mirror the phase modulation range of which is not limited to a small range such as 2π is used, a correction wavefront can be expressed as it is, so that phase wrapping can be omitted.

According to the aberration-correcting method, the laser processing method, and the laser irradiation method according to the first embodiment, aberration of a laser beam is corrected so that the focal point of the laser beam is positioned within a range of aberration occurring inside the medium 60, that is, positioned within a range of longitudinal aberration inside the medium 60 when the aberration is not corrected, so that the PV value of the wavefront can be reduced. As a result, even when an SLM 40 the phase modulation amount of which is limited is used, by reducing the PV value of the correction wavefront, the task on the SLM 40 is reduced, and precise wavefront control becomes possible. As a result, even if a laser is irradiated deep inside the medium 60, the concentration of the focused laser beam can be increased, so that an excellent processing state can be maintained.

Thus, the focal position inside the medium (for example, the processing target, etc.) 60 on which a laser beam is focused is moved to a position at which reduction in the PV value of the correction wavefront becomes possible, so that precise wavefront control can be performed while reducing the task on the SLM 40 by a simple method.

Further, according to the aberration-correcting method, the laser processing method, and the laser irradiation method of the first embodiment, the phase difference between a phase modulation amount at an arbitrary pixel on the SLM 40 corresponding to the incidence portion of the condenser lens 50 and a phase modulation amount at a pixel adjacent to said pixel becomes not more than a phase range in which the phase wrapping technique is applicable. Therefore, the task on the SLM 40 the physical phase modulation range of which is limited is reduced, and precise wavefront control is possible.

An accurate focal position cannot be obtained by calculating aberration by approximation as in the case of Patent Literature 6, however, in the present invention, an accurate focal position can be obtained.

Figure 8:
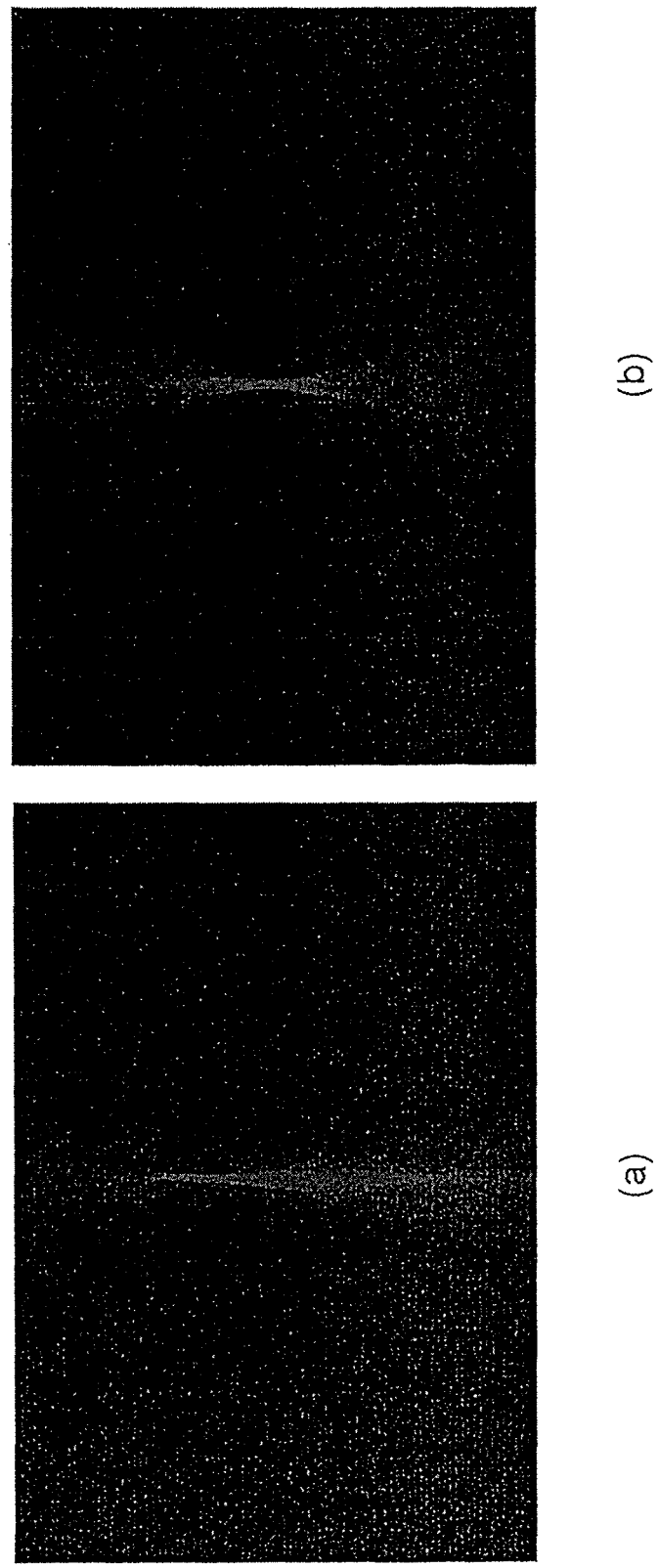
FIG. 8 show results of measurement of a focused state in a processing target when the aberration-correcting method of the first embodiment is used.

FIG. 8 show results of measurement of a focused state in the processing target 60. FIG. 8(a) is a result of measurement of a focused state before correction, and FIG. 8(b) is a result of measurement of a focused state after correction. As shown in FIG. 8, although the same focal position (1.34 mm) as in the case using the conventional method is realized, the PV value of the correction wavefront is small, so that aberration is sufficiently corrected.

Figure 23:
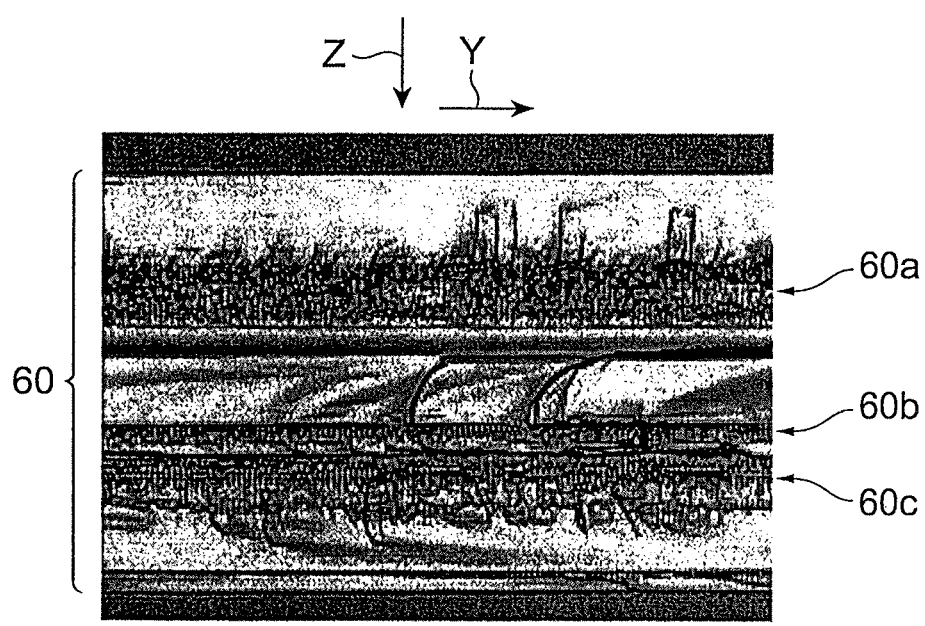
FIG. 23 shows a result of observation of a cut surface of a processing target 60 cut after being subjected to conventional laser processing.
Figure 24:
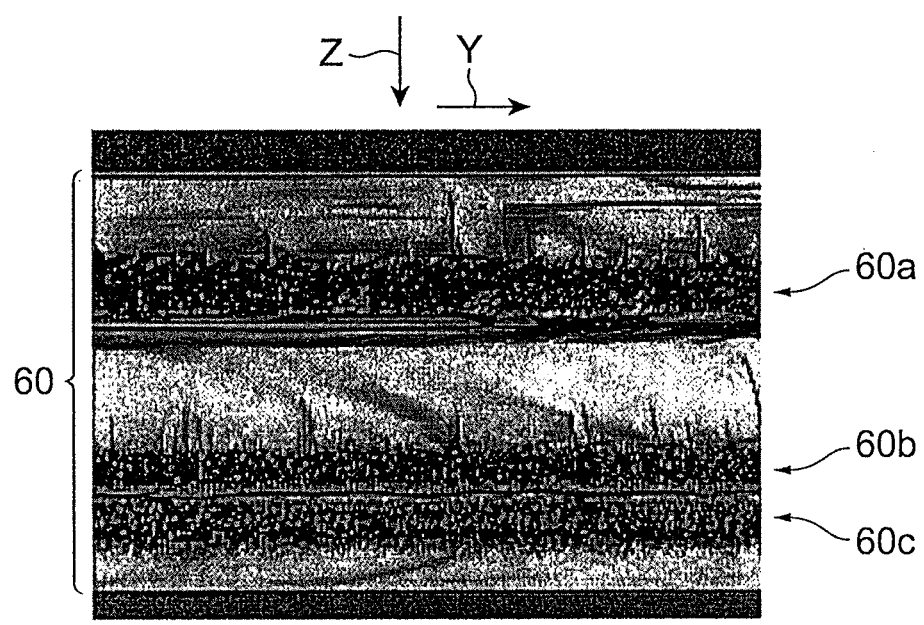
FIG. 24 shows a result of observation of a cut surface of a processing target 60 cut after being laser-processed by using the aberration-correcting method of the first embodiment.

FIG. 23 and FIG. 24 show results of observation of a cut surface of the processing target 60 cut after laser processing. In laser processing in FIG. 23 and FIG. 24, three modified layers 60a, 60b, and 60c were formed by irradiating a laser beam from the direction Z and scanning the laser beam in the direction Y on the processing target 60. FIG. 23 shows a cut surface when the aberration-correcting method of the first embodiment of the present invention is not used in laser processing, that is, a cut surface after laser processing using a laser beam whose aberration is not sufficiently corrected as shown in FIG. 8(a). On the other hand, FIG. 24 shows a cut surface when the aberration-correcting method of the first embodiment of the present invention is used in laser processing, that is, a cut surface after laser processing using a laser beam whose aberration has been sufficiently corrected as shown in FIG. 8(b). Referring to FIG. 23, aberration correction in laser processing is insufficient, so that the modified layers 60a, 60b, and 60c are not uniform, and laser processing is insufficient. On the other hand, referring to FIG. 24, aberration correction in laser processing is sufficiently performed, so that modified layers 60a, 60b, and 60c are uniform, and laser processing is sufficiently performed.

The aberration-correcting method, the laser processing method, and the laser irradiation method of the first embodiment are preferably applicable to internal processing of a substance having a wavelength region with high transmittance, such as glass, silicon, and sapphire substrates. In particular, when forming a modified layer, such as an optical waveguide, or amorphous or crack generating, even if the processing position is deep, aberration can be corrected by the spatial light modulator, and the focal point can be made smaller, and an excellent processing state can be maintained.

[Second Embodiment]

In the aberration-correcting method, the laser processing method, and the laser irradiation method of the first embodiment described above, when the processing position O' shown in FIG. 5 changes, the spherical aberration $\Delta s$ changes, so that each time the processing position O' changes, the correction wavefront must be re-calculated according to the expression (7), so that the calculation time becomes long.

In detail, as described above, it is difficult to directly obtain $\theta_1$, $\theta_2$, and $\Delta$ in the expression (7), and these are obtained by searching in which the value of $\Delta$ is gradually changed and the correction wavefront is repeatedly calculated. Further, in each searching by changing $\Delta$, the value of $\theta$ or the values of $\theta_1$ and $\theta_2$ in the expression (7) must be obtained by the above-described searching method. Specifically, double searching is necessary, and it may take a great deal of calculation time.

As a result, when processing is performed while changing the processing depth, searching during processing may cause a lowering in the processing rate.

Therefore, the inventors of the present invention found an aberration-correcting method which shortens the time by obtaining in advance aberration correction wavefronts the phase modulation amounts of which are small by using the aberration-correcting method of the first embodiment, that is, searching described above, and calculating a correction wavefront at an arbitrary processing position by using an approximate expression of polynomial approximation of the obtained aberration correction wavefronts. Hereinafter, an aberration-correcting method according to a second embodiment of the present invention which shortens the time will be described.

First, before describing the aberration-correcting method according to the second embodiment of the present invention, a laser processing device (laser irradiation device, laser focusing device) that uses this aberration-correcting method will be described.

Figure 9:
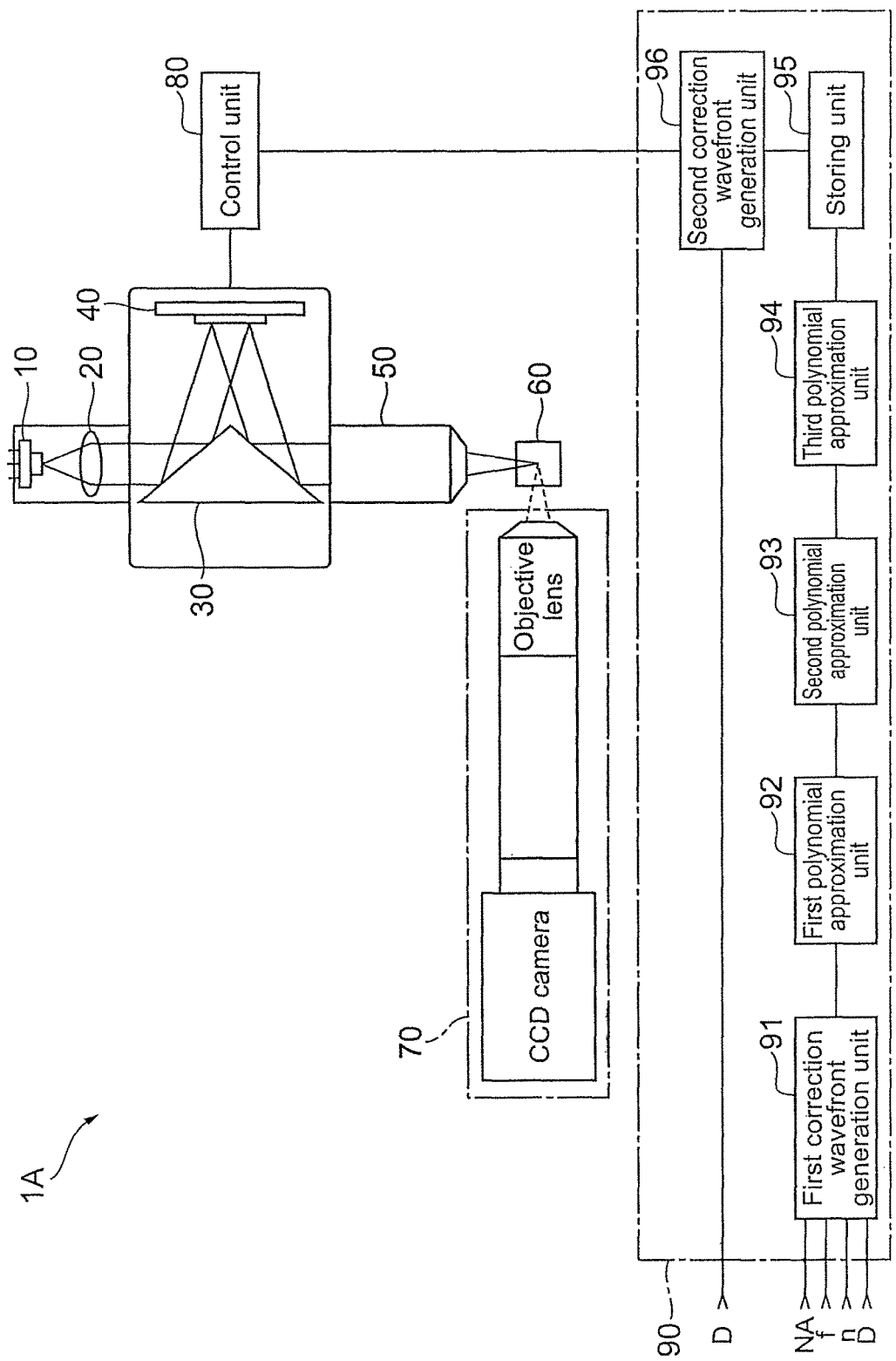
FIG. 9 is a view showing a configuration of a laser processing device (laser irradiation device, laser focusing device) according to a second embodiment and an aberration-correcting device according to an embodiment of the present invention.

FIG. 9 is a view showing a configuration of a laser processing device (laser irradiation device, laser focusing device) according to the second embodiment. The laser processing device 1A shown in FIG. 9 is different from the laser processing device 1 in a configuration further including a control unit 80 and an aberration-correcting device 90 according to an embodiment of the present invention in the laser processing device 1 of the first embodiment. Other components of the laser processing device 1A are the same as in the laser processing device 1.

The control unit 80 receives correction wavefront information from the aberration-correcting device 90 and controls the phase modulation amount of the SLM 40.

The aberration-correcting device 90 is, for example, a computer, and functions as a first correction wavefront generation unit 91, a first polynomial approximation unit 92, a second polynomial approximation unit 93, a third polynomial approximation unit 94, a storing unit 95, and a second correction wavefront generation unit 96 by executing an aberration-correcting program that will be described later.

Figure 10:
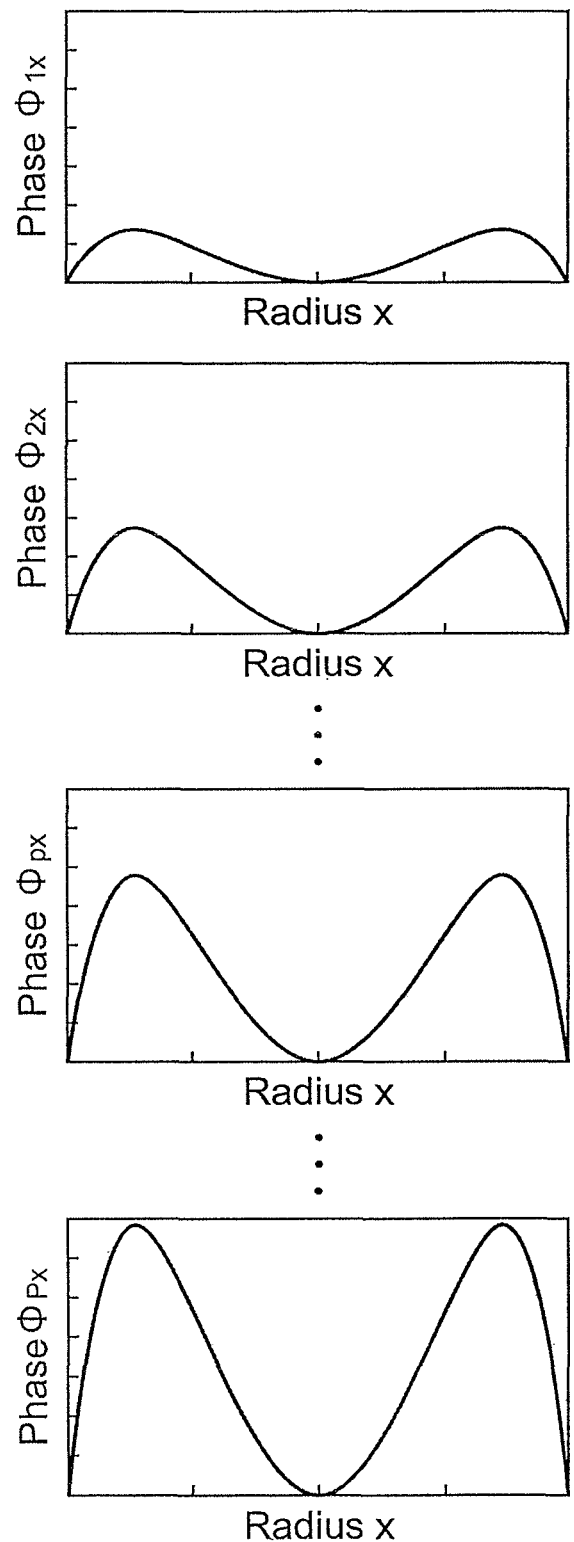
FIG. 10 is a diagram showing phase modulation amounts of a plurality of correction wavefronts generated by a first correction wavefront generation means.

The first correction wavefront generation unit 91 receives a numerical aperture NA and a focal length f determined according to the objective lens 50, and a refractive index n determined according to a medium of the processing target 60. The first correction wavefront generation unit 91 receives a range of processing depth estimated in advance in processing involving a change in processing depth, and a plurality of processing positions (focal depths) $D_1, D_2, \ldots D_p \ldots D_P$ around this range. The number and interval of these focal depths are set so that the polynomial approximation described later can be performed with sufficient accuracy. The first correction wavefront generation unit 91 obtains a plurality of correction wavefronts and a plurality of medium movement distances $d_1, d_2, \ldots d_p, \ldots d_P$ corresponding to the plurality of processing positions $D_1, D_2, \ldots D_p \ldots D_P$ by searching using the expressions (7) and (4) to (6). Specifically, the first correction wavefront generation unit 91 obtains a plurality of correction wavefronts and a plurality of medium movement distances corresponding to the plurality of processing positions $D_1, D_2, \ldots D_p \ldots D_P$ so that a focal point of a laser beam is positioned within a range in which longitudinal aberration is present inside the medium when the aberration is not corrected, and the phase modulation amount of the correction wavefront becomes minimum. As a searching condition, a condition by which a correction wavefront and a medium movement distance are uniquely determined for one processing position, for example, a condition by which "the PV value of the correction wavefront becomes minimum" is applied. Phase modulation amounts $\Phi_{1x}, \Phi_{2x}, \ldots \Phi_{px}, \ldots \Phi_{Px}$ of a plurality of correction wavefronts obtained in this manner, plotted with respect to a radial position x, are shown in FIG. 10.

By the above-described operation, medium movement distances $d_1, d_2, \ldots d_p \ldots d_P$ and distances $\Delta_1, \Delta_2, \ldots \Delta_p, \ldots \Delta_P$ from the point O to the processing positions $D_1, D_2, \ldots D_p \ldots D_P$, and correction wavefronts $\Phi_{1x}, \Phi_{2x}, \ldots \Phi_{px}, \ldots \Phi_{Px}$ corresponding to the plurality of processing positions $D_1, D_2, \ldots D_p \ldots D_P$ are obtained.

The first polynomial approximation unit 92 approximates a data set of medium movement distances $d_1, d_2, \ldots d_p, \ldots d_P$ by an M-order exponential polynomial using a desired focal depth as a variable to obtain one first high-order polynomial (the following expression (8)).

[Mathematical expression 8]

$$d = c_1 * D + c_2 * D^2 \ldots + c_m * D^m \ldots + c_M * D^m \qquad (8)$$

Here, D is a desired focal depth, and $D = d + \Delta$.

The second polynomial approximation unit 93 approximates the phase modulation amounts $\Phi_{1x}, \Phi_{2x}, \ldots \Phi_{px}, \ldots \Phi_{Px}$ of the plurality of correction wavefronts shown in FIG. 10 by a Q-order exponential polynomial using a radial position x as a variable to obtain a plurality of second high-order polynomials as shown in FIG. 11. A plurality of coefficient sequences $a_{1p}, a_{2p}, \ldots a_{qp}, \ldots a_{Qp}$ consisting of coefficients of the same order terms in these second high-order polynomials, that is, the coefficient sequence $a_{1p}$ of the first-order terms to the coefficient sequence $a_{Qp}$ of the Q-order terms are graphed with respect to the medium movement distance $d_p$ and shown in FIG. 12.

Figure 12:
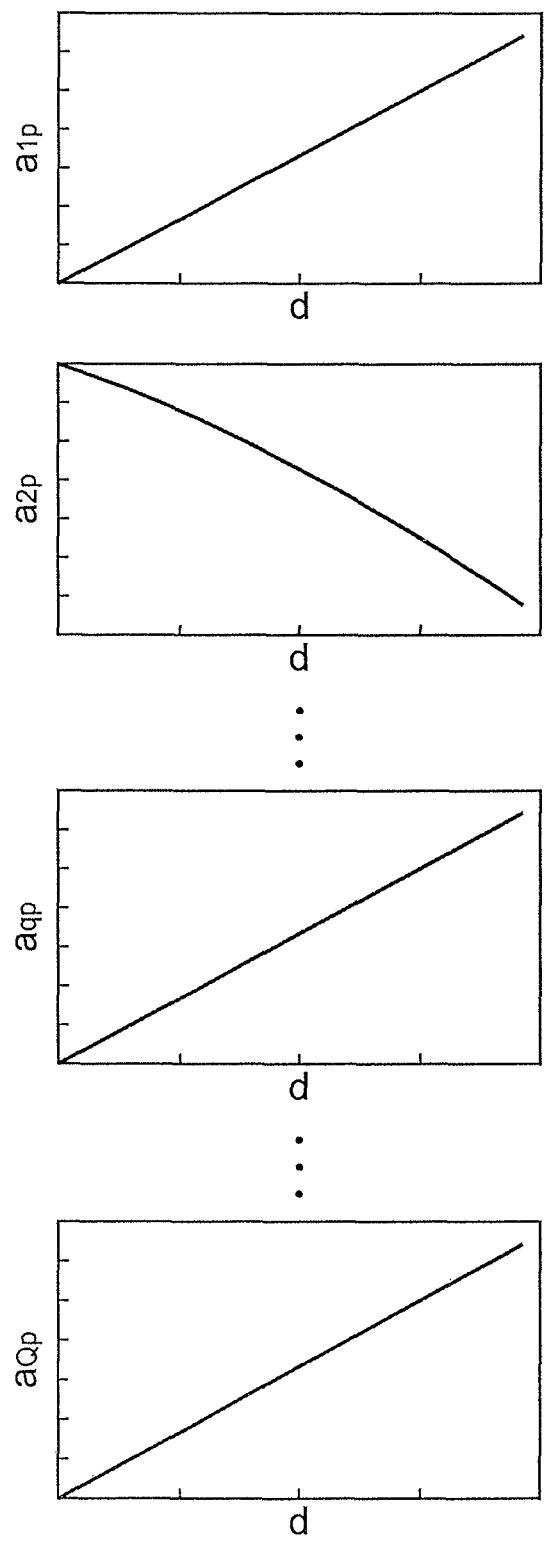
FIG. 12 is a graph of a plurality of coefficient sequences consisting of coefficients of the same order terms in the plurality of second high-order polynomials shown in FIG. 11.

The third polynomial approximation unit 94 approximates the coefficient sequence $a_{1p}$ of the first-order terms to the coefficient sequence $a_{Qp}$ of the Q-order terms of the plurality of second high-order polynomials shown in FIG. 12 by a K-order exponential polynomial using a movement distance d as a variable to obtain a plurality of third high-order polynomials as shown in FIG. 13.

The storing unit 95 stores the coefficients of the plurality of order terms in the plurality of third high-order polynomials shown in FIG. 13, that is, coefficients $b_{11}$ to $b_{1Q}$, $b_{21}$ to $b_{2Q}$, ... $b_{k1}$ to $b_{kQ}$, ... $b_{K1}$ to $b_{KQ}$ of the plurality of first-order to Q-order terms and the coefficient sequence $c_1$, $c_2, \ldots c_q, \ldots c_Q$ in the first high-order polynomial as a coefficient data set as shown in FIG. 14.

By using the coefficient data set stored by the above-described operations, a correction wavefront with respect to a focal depth at an arbitrary position can be generated. Next, a method for generating the correction wavefront will be described.

The second correction wavefront generation unit 96 obtains a medium movement distance d with respect to an arbitrary focal depth D by using the coefficients $c_1$ to $c_Q$ in the coefficient data set and the first polynomial, and further obtains the first-order term coefficient $A_1$ to Q-order term coefficient $A_Q$ of the second high-order polynomial with respect to the arbitrary focal depth D, that is, obtains the second high-order polynomial (the following expression (9)) of the arbitrary processing position D equivalent to the plurality of second high-order polynomials shown in FIG. 11 by using the coefficients $b_{11}$ to $b_{1Q}$, $b_{21}$ to $b_{2Q}$, . . . $b_{k1}$ to $b_{kQ}$, . . . $b_{K1}$ to $b_{KQ}$ in the coefficient data set and the plurality of third high-order polynomials shown in FIG. 13.

[Mathematical expression 9]

$$\Phi'_{px} = A_1{}^*x + A_2{}^*x^2 \ldots + A_q{}^*x^q \ldots + A_Q{}^*x^Q \qquad (9)$$

The second correction wavefront generation unit 96 obtains a correction wavefront at an arbitrary processing position $d_n + \Delta$ by using the second high-order polynomial of the expression (9) shown above.

In the description given above, polynomials consisting of first-order to specific-order exponential terms are used as the first to third polynomials, however, polynomials having other constitutions may also be used. For example, a 0-order exponential term may be added to the first to third polynomials. Alternatively, a polynomial consisting of even-order exponential terms may be used as the second polynomial. Further, polynomials including, for example, a Zernike polynomial, a Gauss function, and a Lorentz function, etc., instead of exponential functions, may also be used. In the second and third polynomials, the medium movement distance d is used as a variable, however, a focal depth (processing position) D or a focal point shift amount Δ may also be used as a variable. When the searching condition is "the medium movement distance d is expressed by a specific function using the focal depth D as a variable," the function may be used instead of the expression (8) and the first polynomial approximation step may be omitted.

Figure 15:
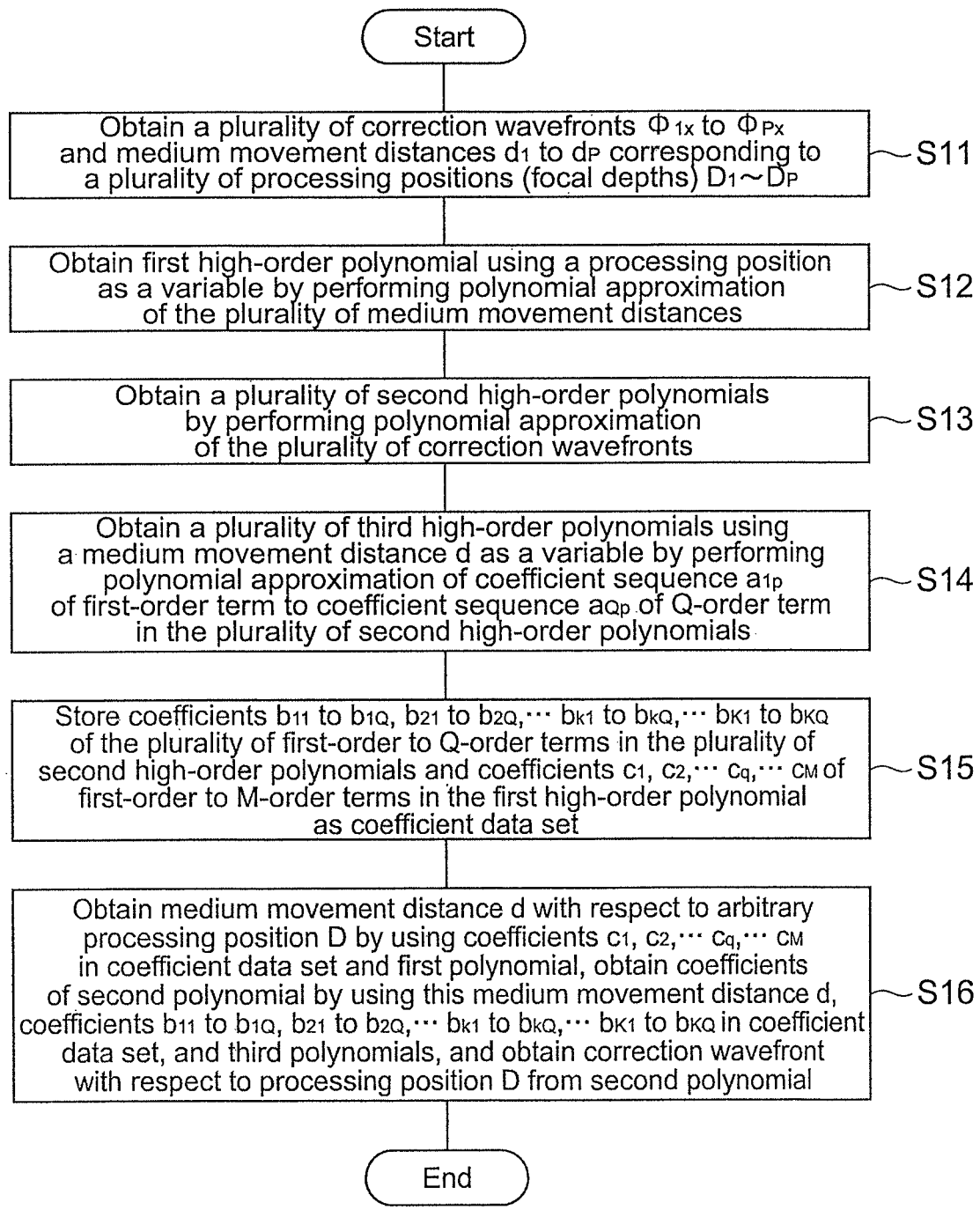
FIG. 15 is a flowchart showing an aberration-correcting method according to the second embodiment of the present invention.

Next, operations of the aberration-correcting device 90 of the present embodiment will be described, and the aberration-correcting method according to the second embodiment of the present invention will be described. FIG. 15 is a flowchart showing an aberration-correcting method according to the second embodiment of the present invention.

First, when a numerical aperture NA and a focal length f determined according to the objective lens 50 and a refractive index n determined according to the processing target are input, and a plurality of processing positions (focal depths) $D_1, D_2, \ldots D_p, \ldots D_P$ in and around a range of processing depth range estimated in advance in processing involving a change in processing depth are input, by the first correction wavefront generation unit 91, according to the aberration-correcting method of the first embodiment, a plurality of correction wavefronts $\Phi_{1x}, \Phi_{2x}, \ldots \Phi_{px}, \ldots \Phi_{Px}$ and a plurality of medium movement distances $d_1, d_2, \ldots d_p, \ldots d_P$ corresponding to the plurality of focal depths $D_1, D_2, \ldots D_p \ldots D_P$ are obtained by searching using the expressions (7) and (4) to (6) described above. Specifically, a plurality of correction wavefronts $\Phi_{1x}, \Phi_{2x}, \ldots \Phi_{px}, \ldots \Phi_{Px}$ corresponding to the plurality of focal depths $D_1, D_2, \ldots D_p \ldots D_P$ are obtained so that a focal point of a laser beam is positioned within a range in which longitudinal aberration is present inside the medium when the aberration is not corrected, and the PV values of the correction wavefronts become minimum (S11: first correction wavefront generation step).

Next, the first polynomial approximation unit 92 performs exponential polynomial approximation of the plurality of medium movement distances $d_1, d_2, \ldots d_p, \ldots d_P$, and as shown in the expression (8), one first high-order polynomial is obtained (S12: first polynomial approximation step).

Next, the second polynomial approximation unit 93 performs exponential polynomial approximation of phase modulation amounts $\Phi_{1x}, \Phi_{2x}, \ldots \Phi_{px}, \ldots \Phi_{Px}$ of the plurality of correction wavefronts shown in FIG. 10, and accordingly, a plurality of second high-order polynomials are obtained as shown in FIG. 11. A plurality of coefficient sequences $a_{1p}, a_{2p}, \ldots a_{qp}, \ldots a_{Qp}$ consisting of coefficients of the same order terms in these second high-order polynomials, that is, the coefficient sequence $a_{1p}$ of the first-order term to the coefficient sequence $a_{Qp}$ of the Q-order term are obtained (S13: second polynomial approximation step).

Next, the third polynomial approximation unit 94 performs exponential polynomial approximation of the coefficient sequence $a_{1p}$ of the first-order terms to the coefficient sequence $a_{Qp}$ of the Q-order terms in the plurality of second high-order polynomials shown in FIG. 12, and accordingly, as shown in FIG. 13, a plurality of third high-order polynomials using the movement distance d as a variable are obtained (S14: third polynomial approximation step). Coefficients of a plurality of order terms in these third high-order polynomials, that is, the coefficients $b_{11}$ to $b_{1Q}$, $b_{21}$ to $b_{2Q}, \ldots b_{k1}$ to $b_{kQ}, \ldots b_{K1}$ to $b_{KQ}$ of the first-order to Q-order terms and the coefficients $c_1, c_2, \ldots c_q, \ldots c_M$ of the first to M-th terms of the first high-order polynomial are stored as a coefficient data set in the storing unit 95 as shown in FIG. 14 (S15: storing step).

In order to calculate a correction wavefront from the stored coefficient data set, in the second correction wavefront generation unit 96, after a medium movement distance with respect to a desired focal depth D and coefficients of the second polynomial are obtained, a correction wavefront is calculated. First, by using the coefficients $c_1, c_2, \ldots c_q, \ldots c_M$ in the coefficient data set and the first polynomial, a medium movement distance d with respect to an arbitrary focal depth D is obtained. Next, by using the medium movement distance d, the coefficients $b_{11}$ to $b_{1Q}$, $b_{21}$ to $b_{2Q}, \ldots b_{k1}$ to $b_{kQ}, \ldots b_{K1}$ to $b_{KQ}$ in the coefficient data set, and the plurality of third high-order polynomials shown in FIG. 13, the coefficient $a_{1p}$ of the first-order term to the coefficient $a_{Qp}$ of the Q-order term of the second high-order polynomial of the arbitrary focal depth D are obtained. Specifically, a second high-order polynomial of the arbitrary focal depth D equivalent to the plurality of second high-order polynomials shown in FIG. 11 is obtained in the form of the expression (9). Thereafter, by using this second high-order polynomial in the form of the expression (9), a correction wavefront at the arbitrary focal depth D is obtained (S16: correction wavefront generation step).

In order to change the processing depth, a correction wavefront corresponding to the changed depth is generated by performing Step S16.

In searching at the first correction wavefront generation step S11 described above, the condition that "the PV value of the correction wavefront becomes minimum" is used, however, other conditions can also be used. However, the condition to be used must be set so that a correction wavefront and a medium movement distance are uniquely determined for one processing position, and the phase difference between adjacent pixels becomes not more than the physical phase modulation amount.

Figure 16:
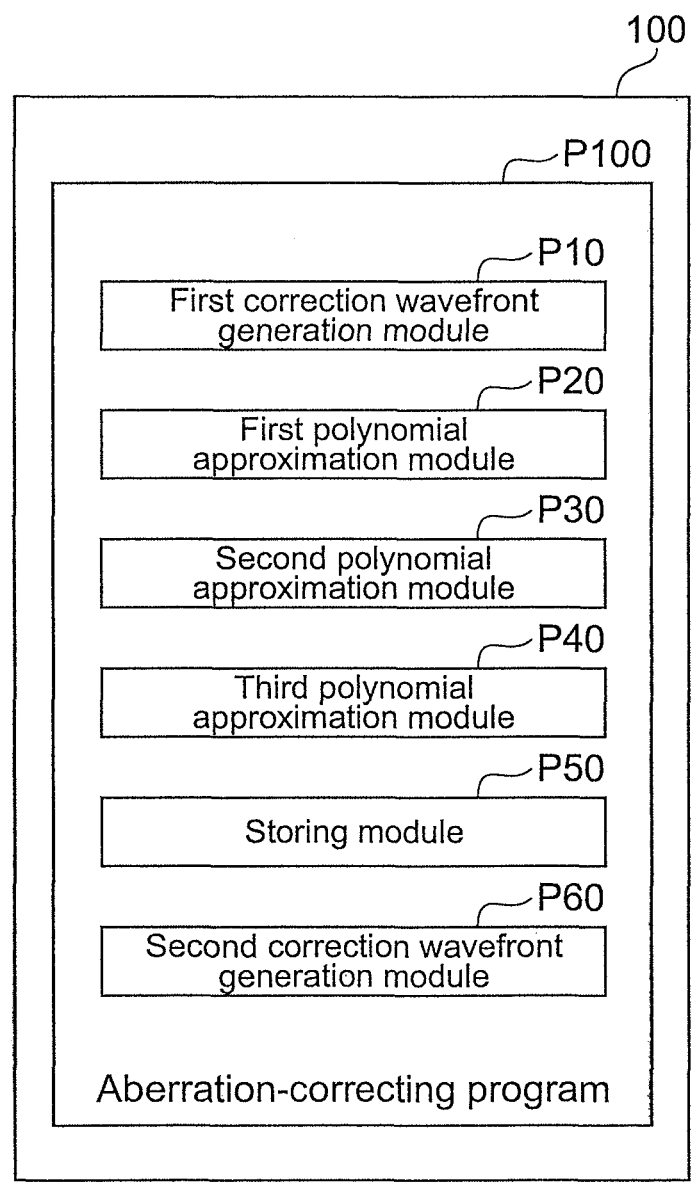
FIG. 16 is a view showing a configuration of an aberration-correcting program according to an embodiment of the present invention, together with a recording medium.

Next, an aberration-correcting program for operating a computer as the aberration-correcting device 90 will be described. FIG. 16 is a view showing a configuration of an aberration-correcting program according to an embodiment of the present invention together with a recording medium.

As shown in FIG. 16, the aberration-correcting program P100 is stored in a recording medium 100 and provided. As the recording medium 100, a recording medium such as a floppy disk, a CD-ROM, a DVD, a ROM or the like, or a semiconductor memory or the like is used by way of example.

Figure 17:
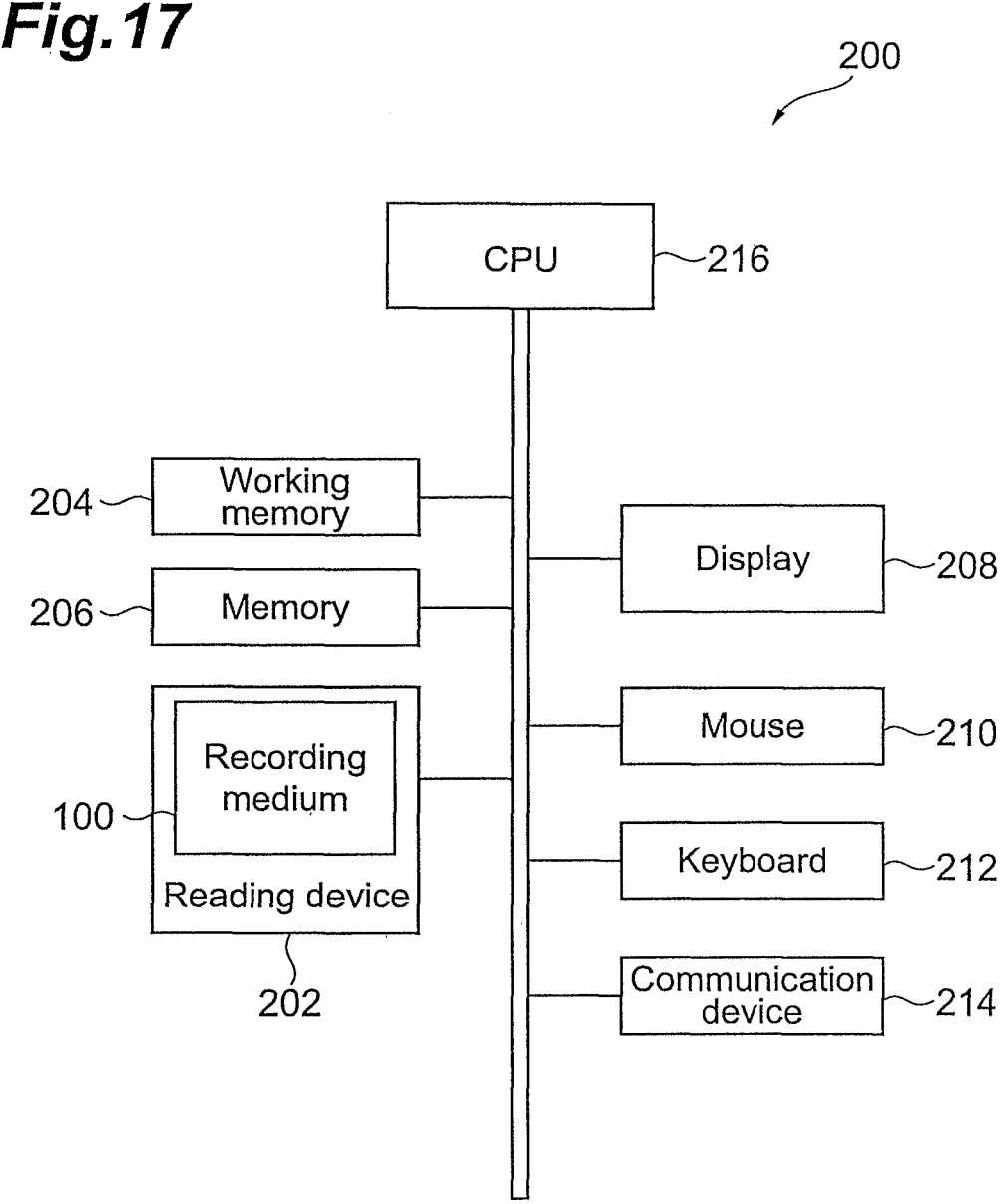
FIG. 17 is a view showing a hardware configuration of a computer for executing a program stored in a recording medium.
Figure 18:
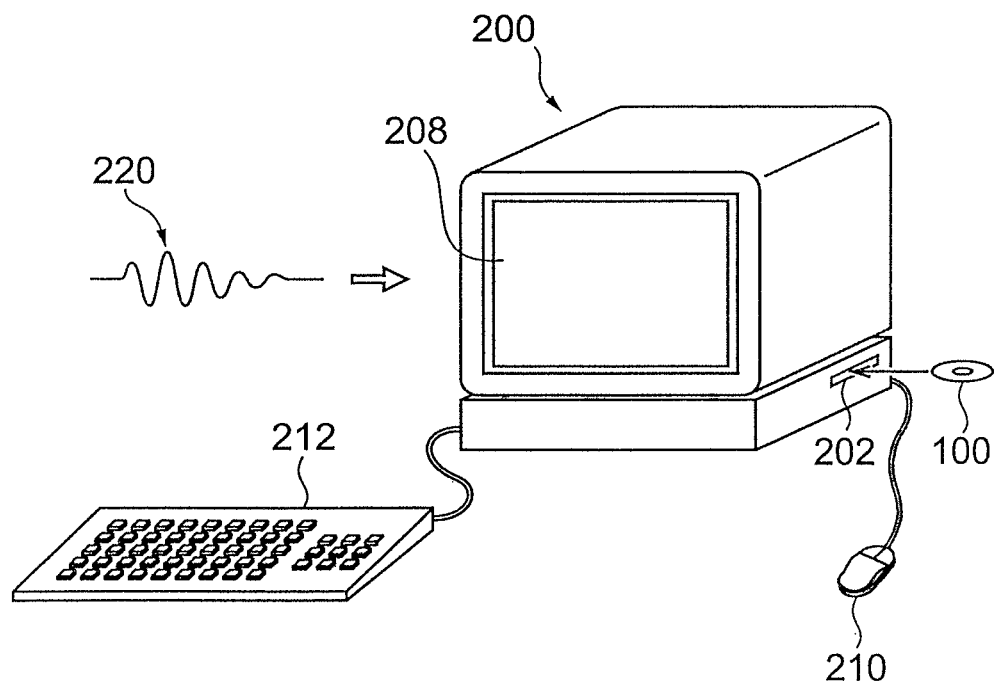
FIG. 18 is a perspective view of the computer for executing a program stored in a recording medium.

FIG. 17 is a view showing a hardware configuration of a computer for executing a program recorded on a recording medium, and FIG. 18 is a perspective view of the computer for executing a program stored in a recording medium.

As shown in FIG. 17, the computer 200 includes a reading device 202 such as a floppy disk drive unit, a CD-ROM drive unit, and a DVD chive unit, etc., a working memory (RAM) 204 in which an operating system is resident, a memory 206 for storing a program stored in the recording medium 100, a display device 208 such as a display, a mouse 210 and a keyboard 212 as input devices, a communication device 214 for transmitting and receiving data, etc., and a CPU 216 which controls execution of programs. When the recording medium 100 is inserted in the reading device 202, the computer 202 becomes accessible to the aberration-correcting program P100 stored in the recording medium 100 from the recording device 202, and can operate as an aberration-correcting device 90 according to the aberration-correcting program P100.

As shown in FIG. 18, the aberration-correcting program P100 may be provided as a computer data signal 220 superimposed on a carrier wave via a network. In this case, the computer 200 stores the aberration-correcting program P100 received by the communication device 214 in the memory 206, and can execute the aberration-correcting program P100.

As shown in FIG. 16, the aberration-correcting program P100 includes a first correction wavefront generation module P10, a first polynomial approximation module P20, a second polynomial approximation module P30, a second polynomial approximation module P40, a storing module P50, and a second correction wavefront generation module P60.

Functions that the first correction wavefront generation module P10, the first polynomial approximation module P20, the second polynomial approximation module P30, the second polynomial approximation module P40, the storing module P50, and the second correction wavefront generation module P60 realize the computer are the same as those of corresponding elements of the above-described first correction wavefront generation unit 91, the first polynomial approximation unit 92, the second polynomial approximation unit 93, the second polynomial approximation unit 94, the storing unit 95, and the second correction wavefront generation unit 96.

Figure 19:
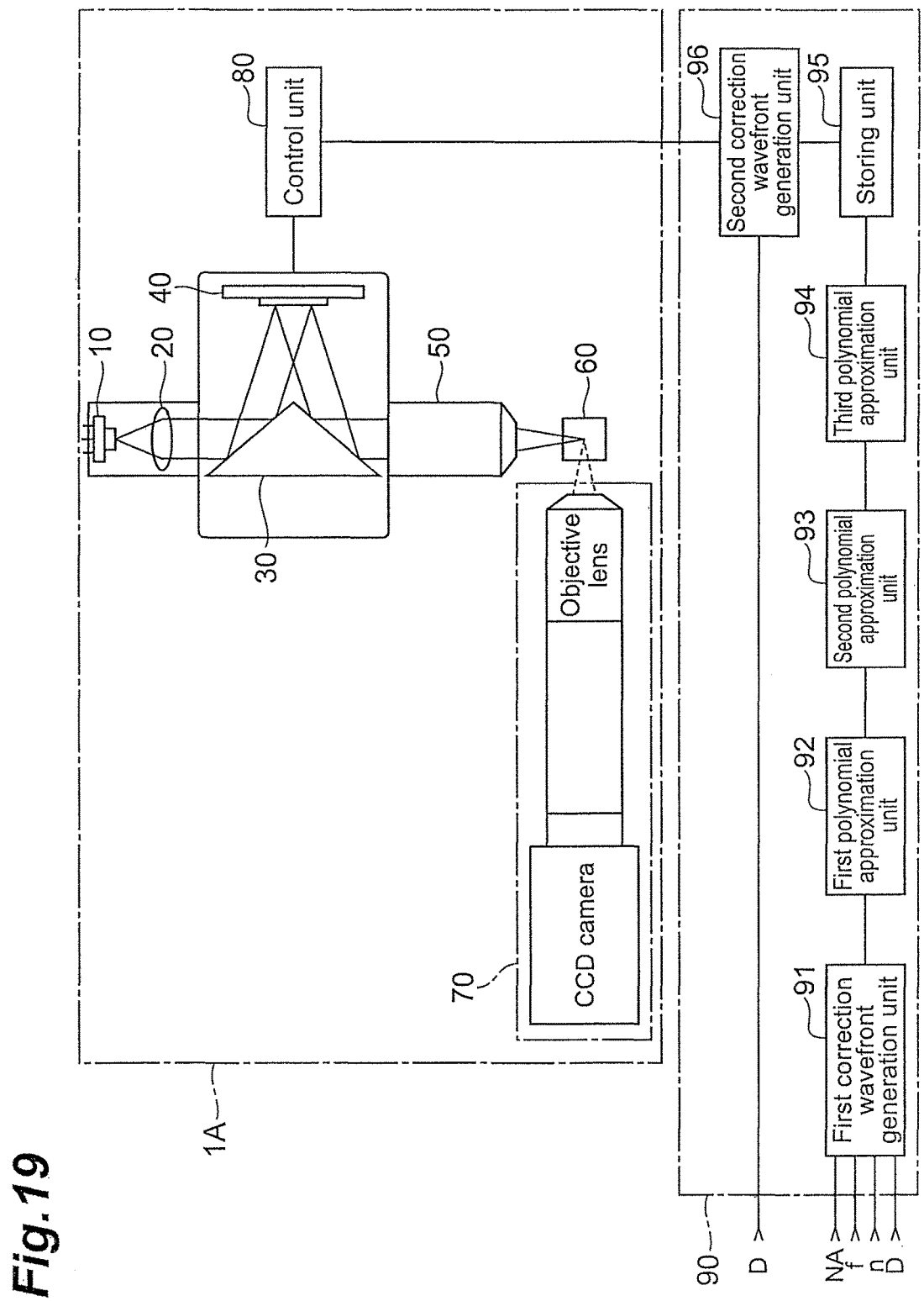
FIG. 19 is a view showing a configuration of an aberration-correcting device and a laser processing device according to an exemplary variation of the present invention.

The present embodiment shows an embodiment in which a computer that functions as the aberration-correcting device 90 is provided integrally inside the laser processing device, however, it is also possible that the computer that functions as the aberration-correcting device 90 is provided separately outside the laser processing device 1A, and correction wavefront information is exchanged between the computer and the laser processing device (FIG. 19).

Figure 20:
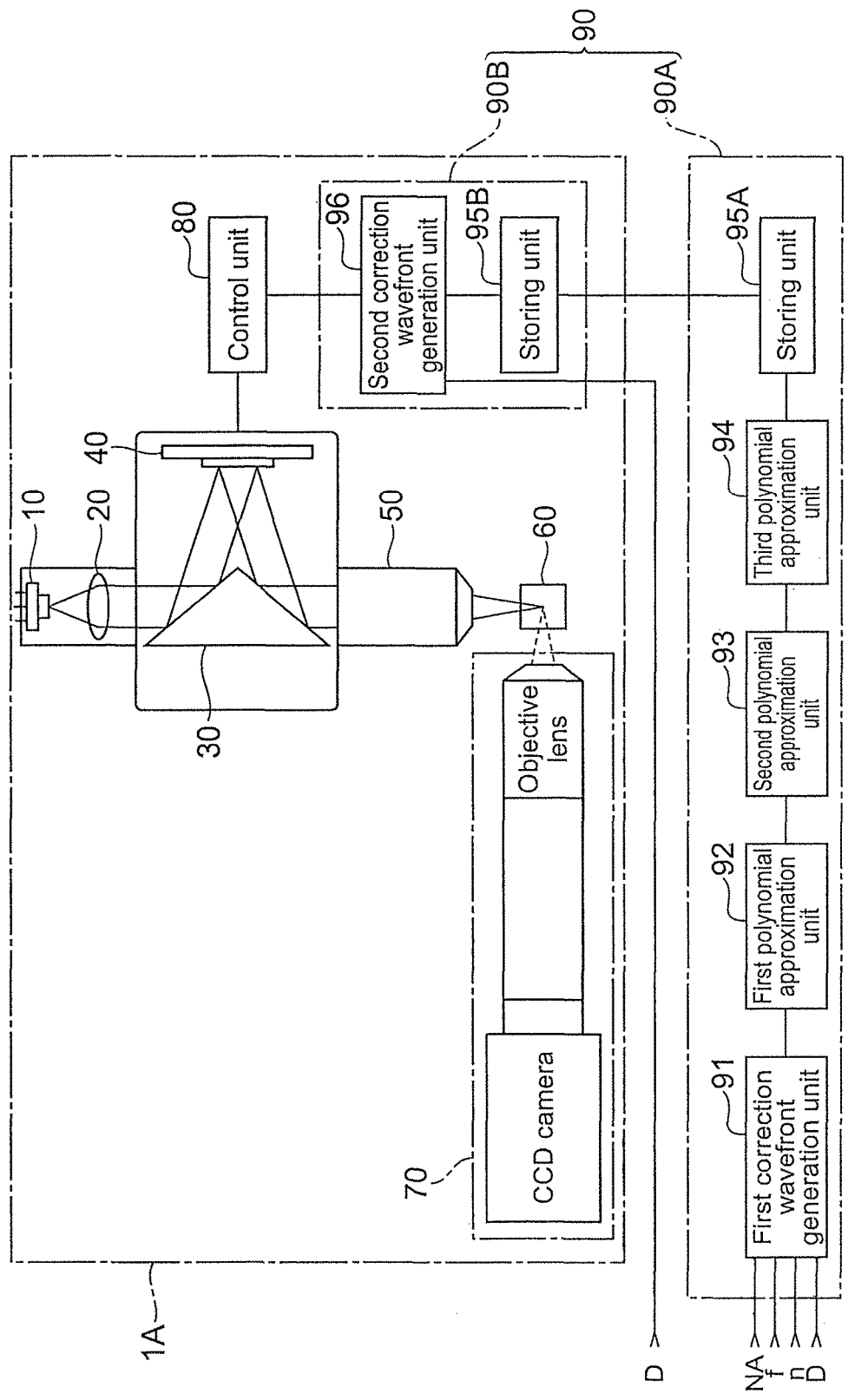
FIG. 20 is a view showing a configuration of the aberration-correcting device and the laser processing device according to the exemplary variation of the present invention.

It is also possible that computers 90A and 90B are provided inside and outside the laser processing device 1A, and these two computers 90A and 90B realize the aberration-correcting device 90. For example, it is possible that the first correction wavefront generation unit 91, the first polynomial approximation unit 92, the second polynomial approximation unit 93, the third polynomial approximation unit 94, and the storing unit 95 as parts of the aberration-correcting device 90 are realized by the external computer 90A, and the remaining storing unit 95 and second correction wavefront generation unit 96 are realized by the internal computer 90B. According to this, between the external computer 90A and the internal computer 90B, that is, the laser processing device 1A, the coefficient data set is exchanged via a recording medium or a communication path, and the contents in the storing unit 95A of the external computer 90A are copied into the storing unit 95B of the internal computer 90B (FIG. 20).

Thus, the aberration-correcting method of the second embodiment and the aberration-correcting device 90 and the aberration-correcting program of the present embodiment also have the same advantages as those of the aberration-correcting method of the first embodiment. Specifically, even in the aberration-correcting method of the second embodiment and the aberration-correcting device 90 and the aberration-correcting program of the present embodiment, as described above, correction wavefronts for correcting aberration of a laser beam are obtained in advance so that a focal point of the laser beam is positioned within a range of longitudinal aberration inside the medium when the aberration is not corrected is obtained, and by using an approximate expression according to high-order polynomial approximation of the correction wavefronts, a correction wavefront at an arbitrary processing position is obtained, so that the correction wavefront of the arbitrary processing position can correct aberration of the laser beam so that the focal point of the laser beam is positioned within the range of longitudinal aberration inside the medium when the aberration is not corrected, and the PV value of the wavefront can be reduced. As a result, even if a spatial light modulator the phase modulation amount of which is limited is used, by reducing the phase modulation amount for aberration correction, the task on the spatial light modulator is reduced, and precise wavefront control becomes possible. As a result, even if a laser is irradiated deep inside a medium, the concentration of a focused laser beam can be increased, and an excellent processing state can be maintained.

Figure 21:
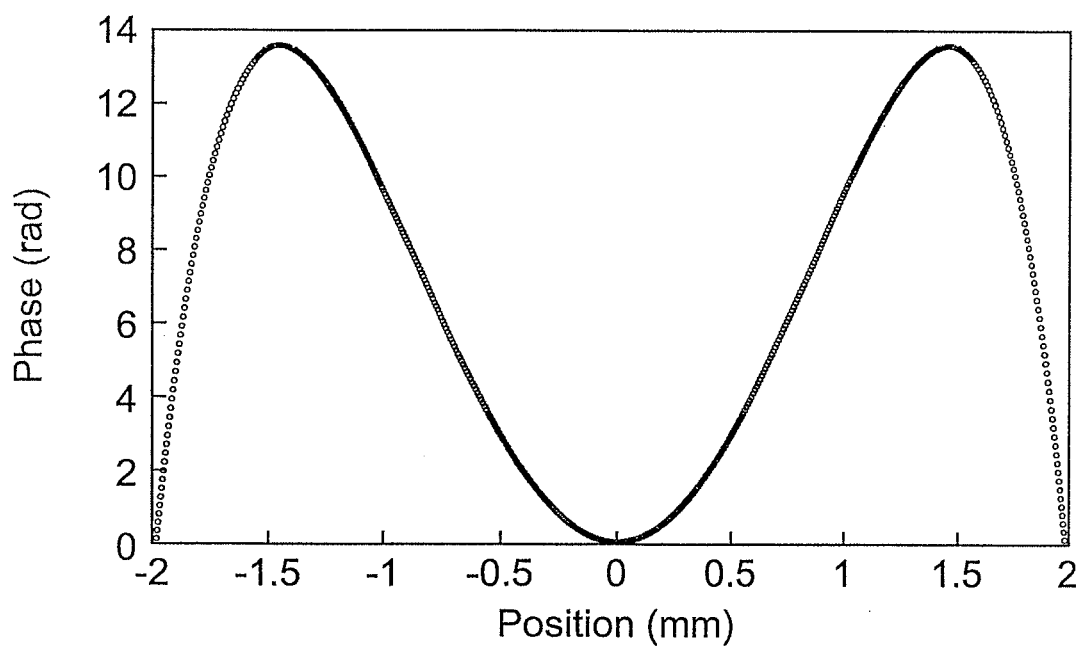
FIG. 21 is a diagram showing a phase modulation amount of a correction wavefront according to an aberration-correcting method of the second embodiment.

For example, when the numerical aperture of the lens 50 is NA=0.55, the focal length is f=3.6 mm, the refractive index of the processing target 60 is n=1.49, the medium movement distance is d=0.637 mm, and the focus deviation is Δ=0.361 mm, that is, the focal position is D=0.998 mm, a correction wavefront becomes a correction pattern as shown in FIG. 21, and the phase modulation amount of the correction wavefront is reduced to approximately 14 radians.

Figure 22:
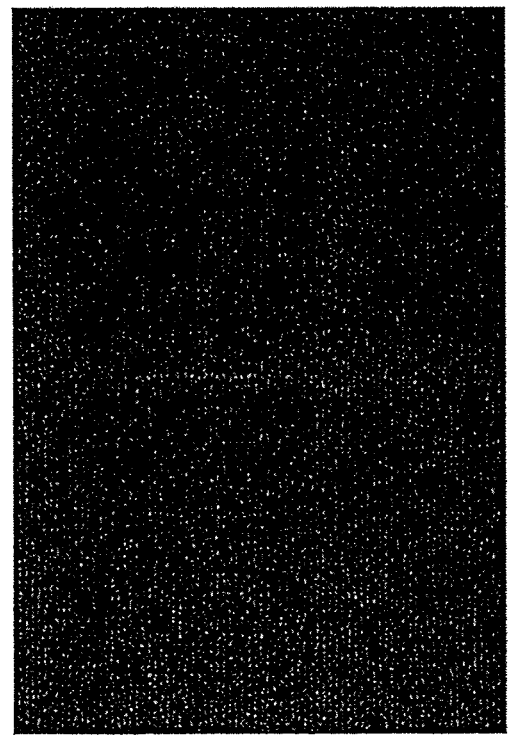
FIG. 22 are views showing results of measurement of a focused state in a processing target by using the correction wavefront shown in FIG. 21.
Figure 22:
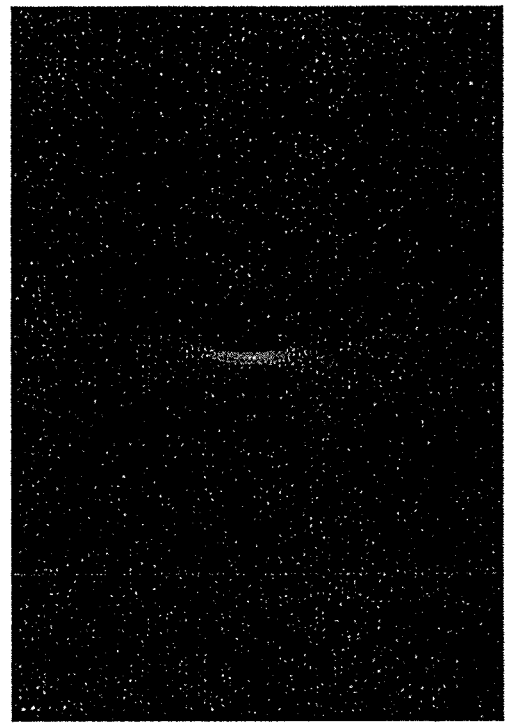

Results of measurement of a focused state in the processing target 60 using this correction pattern are shown in FIG. 22. FIG. 22 show results of observation of a focusing portion when a laser beam with a wavelength of 660 nm is focused on the inside of acryl. FIG. 22(a) shows a result of measurement of a focused state before correction, and FIG. 22(b) shows a result of measurement of a focused state after correction of the second embodiment. As shown in FIG. 21, due to the small phase modulation amount, aberration is sufficiently corrected as shown in FIG. 22(b).

Figure 25:
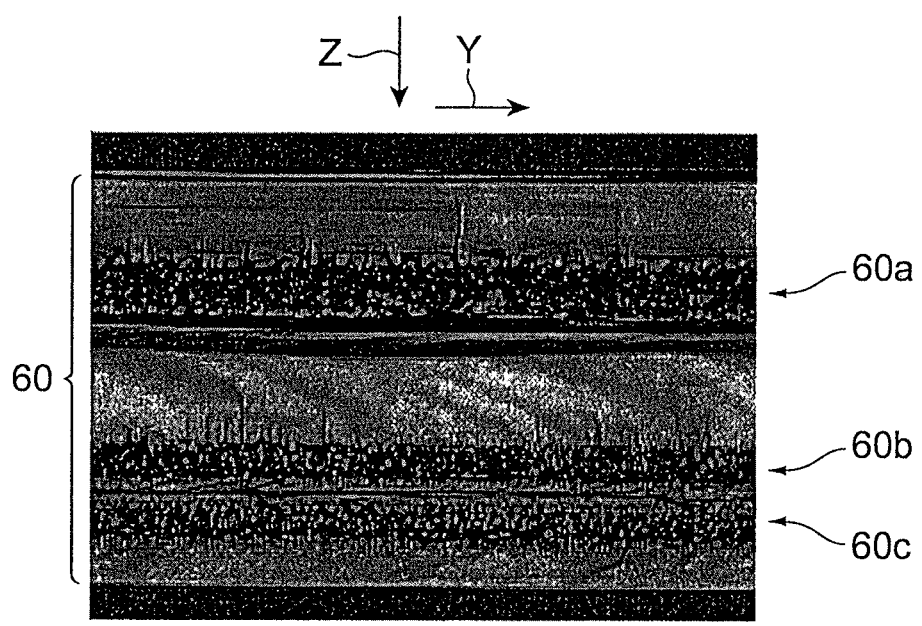
FIG. 25 shows a result of observation of a cut surface of a processing target 60 cut after being laser-processed by using the aberration-correcting method of the second embodiment.

FIG. 23 and FIG. 25 show results of observation of a cut surface of a processing target 60 cut after laser processing. In the laser processing in FIG. 23 and FIG. 25, by irradiating a laser beam from the direction Z and scanning the laser beam in the direction Y on the processing target 60, three modified layers 60a, 60b, and 60c were formed. FIG. 23 shows a cut surface in the case where the aberration-correcting method of the second embodiment of the present invention was not used in laser processing, that is, a cut surface after laser processing using a laser beam whose aberration has not been sufficiently corrected as shown in FIG. 22(a). On the other hand, FIG. 25 shows a cut surface in the case where the aberration-correcting method of the second embodiment of the present invention was used in laser processing, that is, a cut surface after laser processing using a laser beam whose aberration was sufficiently corrected as shown in FIG. 22(b). Referring to FIG. 23, as described above, aberration correction is insufficient in laser processing, so that the modified layers 60a, 60b, and 60c are not uniform, and laser processing is insufficient. On the other hand, referring to FIG. 25, aberration correction was sufficiently performed in laser processing, so that the modified layers 60a, 60b, and 60c are uniform, and laser processing is sufficiently performed. A processing mark of FIG. 25 which is a result of the second embodiment is similar to a processing mark of FIG. 24 which is a result of the first embodiment, so that it can be confirmed that both of these embodiments have effects equivalent to each other.

Further, according to the aberration-correcting method of the second embodiment and the aberration-correcting device and the aberration-correcting program of the present embodiment, correction wavefronts for a plurality of processing positions are obtained in advance, and high-order polynomial approximation of these correction wavefronts is performed, so that a proper correction wavefront can be obtained by only performing an arithmetic operation according to the approximate expression. As a result, the time for re-calculating the correction wavefront when changing the processing depth can be shortened, and a lowering in the processing rate can be reduced. Further, even for an arbitrary processing position different from the processing positions obtained in actuality by searching, a proper correction wavefront can be obtained.

The present invention is not limited to the above-described embodiments, but can be variously varied. For example, in the embodiments, a phase-modulation type reflective SLM 40 which applies a voltage to an independent pixel is used, however, even when a phase-modulation type transmissive SLM which applies a voltage to an independent pixel is used, the same advantages can be obtained. Even when a deformable mirror is used, the same advantages can be obtained.

Further, it is also possible that between the SLM 40 and the objective lens 50, a relay lens system consisting of one or two or more lenses is disposed so that the modulation surface of the SLM 40 and the entrance pupil plane of the objective lens 50 are substantially in an image forming relationship. Accordingly, the wavefront modulated by the SLM 40 is propagated to the objective lens 50 without Fresnel diffraction, so that excellent aberration correction can be performed. When the modulation surface of the SLM 40 is larger than the pupil plane of the objective lens 50, if the image forming system commonly serves as a reduction system, the light amount of the laser beam can be effectively used, and the effective region of the SLM 40 can be sufficiently used.

In the present embodiment, single-point processing is shown by way of example, however, the concept of the present invention is also applicable to multi-point processing for processing a plurality of processing points which are three-dimensionally distributed. For example, in two-point processing, to the phases of two Fresnel lens patterns with different focal positions, phases of correction wavefronts set by considering the processing depths are added. When the obtained phases of the patterns of the two points are defined as $\Phi_A$ and $\Phi_B$, by extracting only the phases from $\exp(\Phi_A) + \exp(\Phi_B)$, a hologram pattern of the spatial light modulator is obtained. Thus, the spatial light modulator has advantage in three-dimensional processing. Specifically, a large number of focal points can also be generated at different positions in a plane in the depth direction by modulating incident light, and in comparison with processing in which single-point processing is repeated, the throughput of processing can be improved.

In this multi-point processing, as in the case of the present embodiment, for focusing on different processing depths, correction wavefronts corresponding to the processing positions are also obtained. In this case, by performing searching using the expressions (7) and (4) to (6), etc., correction wavefronts can be obtained so that the focal points of the laser beam are positioned within a range of longitudinal aberration occurring inside the medium and the phase modulation amounts of the correction wavefronts becomes minimum, however, this searching takes a great deal of time. Therefore, by applying the aberration-correcting method using the above-described aberration-correcting device 90 to this multi-point processing, the time to be taken for re-calculating the correction wavefront when changing the processing depth can be shortened, and a lowering in the processing rate can be reduced.

In this multi-point processing, Fresnel zone plate patterns (consisting of two values of 0 and $\pi$) may also be used instead of the above-described Fresnel lens patterns. When adding phases of correction wavefronts set by considering the processing depths of the Fresnel lens patterns to the phases of the Fresnel lens patterns, for example, a phase of a grating pattern or an arbitrary CGH pattern for generating multiple points within a plane with a uniform depth may be added to the Fresnel lens patterns.

In the present embodiment, an aberration-correcting method in a laser processing device is described, and this aberration-correcting method is applicable to various optical system devices. For example, the aberration-correcting method and laser irradiation method of the present invention are also applicable to laser irradiation devices such as microscopes. Among various microscopes, the present invention is particularly suitable for a laser-scanning microscope. Hereinafter, an example of a laser-scanning microscope will be described as a laser irradiation device and a laser irradiation method of the present invention.

For example, a laser-scanning microscope scans a focal position of a laser beam not only in a direction perpendicular to the optical axis direction but also in the optical axis direction. Specifically, the laser-scanning microscope generates a focal point not only on the surface but also the inside of a measuring target. In this case, the focal point expands and the peak intensity decreases due to aberration, and the resolution and the image contrast lower. By applying the aberration-correcting method and laser irradiation method of the present embodiment to this laser-scanning microscope, even if an SLM the phase modulation amount of which is limited is used, the concentration of a focused laser beam on the inside of the measuring target can be improved and an image with high resolution and high image contrast can be measured even at a deep position. In a confocal microscope or a multi-photon laser-scanning microscope as a kind of laser-scanning microscope, if the peak intensity at the focal position of irradiation light decreases, the measured light intensity dramatically decreases, so that the aberration correction is especially effective. Like the laser-scanning microscope, in some imaging devices which obtain an image by scanning a focusing beam, a light source such as an SLD (Super-Luminescent Diode) that has a narrow wavelength band and high spatial coherence like laser is used, and to such a light source, the aberration-correcting method and laser irradiation method described here can be applied.

The aberration-correcting method of the present invention is applicable to various microscopes as well as the above-described laser-scanning microscope, and is preferably applicable to an imaging device such as a microscope which widely illuminates a measuring target and detects the measuring target by an image sensor. In this kind of microscope, the light source is not limited to a laser beam, and noncoherent light may be used. Thus, the aberration-correcting method of the present invention is also applicable to a microscope (light irradiation device) using noncoherent light. Hereinafter, as a light irradiation device relating to the present invention, an example of this kind of microscope will be shown.

Figure 26:
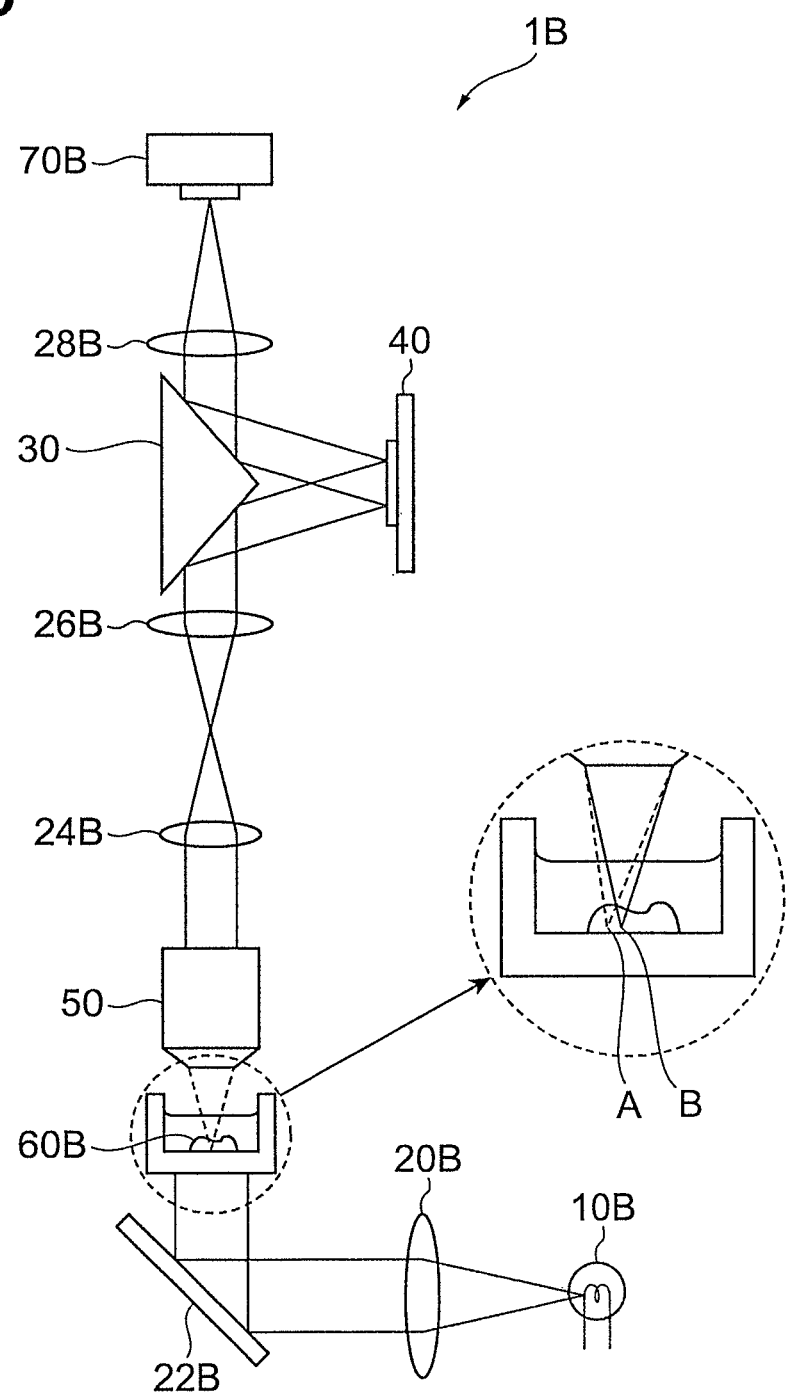
FIG. 26 is a view showing an example of a light irradiation device using an aberration-correcting method of the present invention.

FIG. 26 is a light irradiation device according to an embodiment of the present invention, showing an example of a microscope which widely illuminates a measuring target and images the measuring target by an image sensor. The microscope 1B shown in FIG. 26 includes a light source 10B, a condenser lens 20B, a mirror 22B, an objective lens 50, relay lenses 24B and 26B, a prism mirror 30, a spatial light modulator 40, an imaging lens 28B, and a camera (image sensor) 70B. In the light irradiation device of this embodiment, as a specimen (medium) 60B of a measuring target, living tissue in a container with water is assumed.

The light source 10B is, for example, an illumination such as an incandescent lamp. Light from the light source 10B is converted into parallel light by the condenser lens 20B, and reflected by the mirror 22B to widely illuminate the specimen 60B. Transmitted and forward-scattered light from the specimen 60B is made incident on the objective lens 50, and light outgoing from the objective lens 50 is guided onto the SLM 40 via the relay lenses 24B and 46B and the prism mirror 30. The light reflected by the SLM 40 is guided to the camera 70B via the prism mirror 30 and the imaging lens 28B, and forms an image of the specimen 60B on the surface of the camera 70B. In this embodiment, the relay lenses 24B and 26B are provided between the objective lens 50 and the SLM 40 so that the entrance pupil plane of the objective lens 50 and the SLM 40 have a conjugate relationship. The lenses 50, 24B, 26B, and 28B are disposed so that the specimen 60B and the surface of the camera 70 have an image forming relationship.

In the light irradiation device of this embodiment, the specimen 60B is regarded as a group of points, and each point is regarded as a secondary light source. Specifically, the specimen 60B is regarded as a group of secondary point light sources. Thus, between the specimen 60B that is a group of secondary point light sources and the camera 70B, the aberration-correcting method of the present invention is applied.

From each secondary point light source, spherical wave light is emitted, and is converted into substantially planar wave light by the objective lens 50. Here, the specimen 60 is in water, so that light emitted from each secondary point light source has spherical aberration due to refractive index mismatch between air and water, and light to outgo from the objective lens 50 becomes a planar wave that includes wavefront aberration expressed by the expression (7). Therefore, when forming an image on the camera 70B by the imaging lens 28B, the image is influenced by the aberration, and the spatial resolution and contrast of the image are lowered.

Light that outgoes from the objective lens 50, and the planar wave light including wavefront aberration is transmitted onto the SLM 40 by the relay lenses 24B and 26B. At this time, by applying phase modulation expressed by the expression (7) to the SLM 40, the aberration can be removed. Accordingly, light to outgo from the SLM 40 becomes light of a nearly perfect planar wave from which wavefront aberration has been removed. As a result, when forming an image on the camera 70B by the imaging lens 28B, an image without aberration is formed, and the resolution and contrast of the image can be improved.

In the laser processing devices of the first and second embodiments, a light source is above the prism mirror 30, and light is propagated from the upper side to the lower side, however, in the light irradiation device of the present embodiment, the light propagation direction is reverse thereto. A light source is below the objective lens 50, and light is propagated from the lower side to the upper side. In the scope of classical optics, light propagation is invariable with respect to time reversal, so that it is evident that aberration correction is performed regardless of the light propagation direction as long as the configuration is the same. However, in the laser processing devices of the first and second embodiments, the focal point is on the optical axis, however, in the light irradiation device of the present embodiment, the light source 10B is not only on the optical axis but also on other positions, so that an influence of this will be considered.

Two luminous points in the specimen 60B, that is, a luminous point A on the optical axis and a luminous point B out of the optical axis are considered. Light to be emitted from the luminous point A is influenced only by spherical aberration because the luminous point A is on the optical axis, and the aberration is satisfactorily removed by the aberration correction of the present invention. On the other hand, light to be emitted from the luminous point B includes not only spherical aberration but also other aberrations because the luminous point B is out of the optical axis. However, in a normal microscope, the observation field is narrow. As long as the luminous point B is included in the observation field, the deviation from the optical axis is small, and aberrations other than spherical aberration are sufficiently small. Therefore, aberration is also satisfactorily removed from the light to be emitted from the luminous point B by the aberration correction of the present invention.

In the light irradiation device of this embodiment, transillumination is shown, however, the aberration-correcting method of the present invention is also applicable to epi-illumination. Further, in the light irradiation device of this embodiment, the relay lenses 24B and 26B are used, however, these can be omitted. In this case, it is preferable that the SLM 40 and the objective lens 50 are made close to each other. In the light irradiation device of this embodiment, as the light source 10B, an incandescent lamp is used, however, as the light source 10B, other white light sources, lasers, SLDs, and LEDs, etc., can also be used. Further, it is also possible that light the wavelength band of which is limited by using a band-pass filter in the white light source is used as illumination light.

The present embodiment is described by using an example of a processing target with a spatially uniform refractive index, however, the present invention is also applicable to a case where the refractive index can be regarded as substantially uniform. For example, in the case of a transparent substrate having a thin film such as an anti-reflection film formed on the surface and the back surface, the thin film layer is thin, and aberration caused by the thin film is small and negligible. Alternatively, when a processing target formed by laminating and bonding identical thin glasses is used, a glass layer and a bonding layer are alternately laminated in the depth direction, and the thickness of the bonding layer is thin and the refractive index difference from glass is small, and aberration occurring in the bonding layer is small and negligible. Further, the above-described embodiments are described by using a case where light is focused on the inside of a processing target, however, the present invention is also applicable to focusing near the back surface. For example, in the manufacturing process of a liquid crystal panel, there is a case where a wiring pattern formed on the back surface of a glass substrate is cut by a laser beam made incident from the surface, and the present invention is also applicable to this case.

INDUSTRIAL APPLICABILITY

The present invention is applicable to a purpose involving a laser irradiation position deep in a medium and requiring a high concentration of a focused of a laser beam.

REFERENCE SIGNS LIST 1, 1A: Laser processing device (laser irradiation device, laser focusing device)
1B: Light irradiation device (microscope)
10, 10B: Light source
20, 20B, 24B, 26B, 28B: Lens
30, 22B: Mirror
40: Spatial light modulator (SLM)
50: Objective lens (focusing means, condenser lens)
60: Processing target (medium)
70: Measurement system
70B: Camera (image sensor)
80: Control unit
90, 90A, 90B: Aberration-correcting device
91: First correction wavefront generation unit (first correction wavefront generation means)
92: First polynomial approximation unit (first polynomial approximation means)
93: Second polynomial approximation unit (second polynomial approximation means)
94: Third polynomial approximation unit (third polynomial approximation means
95: Storing unit (storing means)
96: Second correction wavefront generation unit (second correction wavefront generation means)
100: Recording medium
200: Computer
202: Reading device
206: Memory
208: Display device
210: Mouse
212: Keyboard
214: Communication device
220: Computer data signal
P100: Aberration-correcting program
P10: First correction wavefront generation module
P20: First polynomial approximation module
P30: Second polynomial approximation module
P40: Third polynomial approximation module
P50: Storing module
P60: Second correction wavefront generation module

The invention claimed is:

1. A microscope for capturing an inside image of a sample, comprising:
   a light source configured to output illumination light,
   an illumination optical system including a spatial light modulator is configured to modulate the illumination light, and configured to irradiate an inside of a sample with the illumination light that is modulated by the spatial light modulator,
   a detection lens having an detection optical axis that intersects with an optical axis of the illumination optical system, and
   a light detector optically coupled to the detection lens and configured to capture an inside image of the sample.

2. The microscope according to claim 1, wherein the illumination optical system includes a condenser lens optically coupled to the spatial light modulator.

3. The microscope according to claim 2, wherein the condenser lens comprises an illumination objective lens.

4. The microscope according to claim 2, wherein the illumination optical system includes relay lenses optically coupled to the spatial light modulator and the condenser lens.

5. The microscope according to claim 2, wherein the spatial light modulator and an entrance pupil of the condenser lens are in an image forming relationship.

6. The microscope according to claim 1, wherein the spatial light modulator comprises a deformable mirror or a Liquid Crystal on Silicon-Spatial Light Modulator.

7. The microscope according to claim 1, wherein the microscope is a multi-photon microscope.

8. The microscope according to claim 1, wherein the microscope is a laser scanning microscope.

9. The microscope according to claim 1, wherein the microscope is a confocal microscope.

10. The microscope according to claim 1, wherein the spatial light modulator is configured to correct aberration of the illumination light.

11. The microscope according to claim 1, wherein the light detector comprises an image sensor.

12. A microscopy method for capturing an inside image of a sample, comprising:
   by a spatial light modulator, modulating illumination light,
   by an illumination optical system, irradiating an inside of a sample with the illumination light that is modulated by the spatial light modulator,
   by a light detector, capturing an inside image of the sample via a detection lens having a detection axis that intersects with an optical axis of the illumination optical system.

13. The microscopy method according to claim 12, wherein
   the illumination optical system includes a condenser lens optically coupled to the spatial light modulator.

14. The microscopy method according to claim 13, wherein
   the condenser lens comprises an illumination objective lens.

15. The microscopy method according to claim 13, wherein the illumination optical system includes relay lenses optically coupled to the spatial light modulator and the condenser lens.

16. The microscopy method according to claim 13, wherein
the spatial light modulator and an entrance pupil of the condenser lens are in an image forming relationship.

17. The microscopy method according to claim 12, wherein
the spatial light modulator comprises a deformable mirror or a Liquid Crystal on Silicon-Spatial Light Modulator.

18. The microscopy method according to claim 12, further comprising:
scanning the modulated light.

19. The microscopy method according to claim 12, wherein
the modulating corrects aberration of the illumination light.

20. The microscope according to claim 12, wherein
the light detector comprises an image sensor.

* * * * *